United States Patent
Itoi

(10) Patent No.: US 6,826,183 B1
(45) Date of Patent: Nov. 30, 2004

(54) DATA TRANSMISSION/RECEPTION METHOD AND APPARATUS THEREOF

(75) Inventor: Satoshi Itoi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/121,516

(22) Filed: Jul. 23, 1998

(30) Foreign Application Priority Data

Jul. 23, 1997 (JP) ............................................. 9-196912

(51) Int. Cl.[7] .......................... H04L 12/56; H04N 7/12
(52) U.S. Cl. .................................. 370/392; 375/240.28
(58) Field of Search ................................ 370/392, 394, 370/474, 503, 509, 535, 537; 375/240, 240.28

(56) References Cited

U.S. PATENT DOCUMENTS

| | | | | |
|---|---|---|---|---|
| 5,396,497 A | * | 3/1995 | Veltman ................ | 375/240.25 |
| 5,420,866 A | * | 5/1995 | Wasilewski ............ | 370/110.1 |
| 5,559,808 A | * | 9/1996 | Kostreski et al. ........ | 370/108 |
| 5,559,999 A | * | 9/1996 | Maturi et al. ............ | 713/400 |
| 5,703,877 A | * | 12/1997 | Nuber et al. ............ | 370/395.64 |
| 5,726,989 A | * | 3/1998 | Dokic ..................... | 370/509 |
| 5,784,683 A | * | 7/1998 | Sistanizadeh et al. ..... | 455/5.1 |
| 5,835,493 A | * | 11/1998 | Magee et al. ............ | 370/394 |
| 5,838,678 A | * | 11/1998 | Davis et al. ............. | 370/389 |
| 5,920,572 A | * | 7/1999 | Washington et al. ...... | 370/535 |
| 6,031,577 A | * | 2/2000 | Ozkan et al. ............ | 348/465 |
| 6,148,135 A | * | 11/2000 | Suzuki .................... | 386/12 |
| 6,151,441 A | * | 11/2000 | Kawamura et al. ........ | 386/95 |
| 6,157,674 A | * | 12/2000 | Oda et al. ................ | 375/240 |
| 6,163,647 A | * | 12/2000 | Terashima et al. ........ | 386/96 |
| 6,363,207 B1 | * | 3/2002 | Duruoz et al. ........... | 386/68 |

FOREIGN PATENT DOCUMENTS

| | | |
|---|---|---|
| JP | 479588 | 12/1992 |
| JP | 5119788 | 5/1993 |
| JP | 730854 | 1/1995 |
| JP | 8-205075 | 8/1996 |
| JP | 9-284763 | 10/1997 |
| JP | 9-331523 | 12/1997 |
| JP | 10-51750 | 2/1998 |
| JP | 10-229552 | 8/1998 |

OTHER PUBLICATIONS

Japanese Office Action issued Feb. 9, 2000 in a related application and English translation of relevant portions.
BIT (Kyoritsu Publishing Company, Limited), vol. 29, No. 7, Jul. 1, 1997, pp. 101–111.

* cited by examiner

*Primary Examiner*—Alpus H. Hsu
*Assistant Examiner*—Toan D. Nguyen
(74) *Attorney, Agent, or Firm*—Dickstein, Shapiro, Morin & Oshinsky, LLP.

(57) ABSTRACT

Data transmission/reception apparatus according to the present invention MPEG-2 based transmits/receives input data including; at least MPEG-2 based video data and audio data in a low bit rate and in a low error occurrence rate. The data transmission apparatus is comprised of: a division circuit (30) which separates the input data into video, audio, and user data; FIFO circuits (31 to 33); a combination circuit (35); a PES private data attachment circuit 36; a PTS generation/attachment circuit (37); a PES header attachment circuit (39); and a transport header attachment circuit (40). On the other hand, the data reception apparatus is comprised of: a transport header separation circuit (51); a PES header separation circuit (52); a PTS detection circuit (53); a PES private data separation circuit, a distribution circuit (55); FIFO circuits (56 to 58); a FIFO control circuit; and a combination circuit (60).

28 Claims, 18 Drawing Sheets

Fig.23

| LABEL NAME | NUMBER OF BIT(S) | NUMBER OF BYTE(S) | DATA CONTENT |
|---|---|---|---|
| SYNC BYTE | 8 | 1 | 47H |
| TRANSPORT ERROR INDICATOR | 1 | 2 | 0 |
| PAYLOAD UNIT START INDICATOR | 1 | | CRC-OFF:1(PAYLOAD 0 OR 1) CRC-ON:1(PAYLOAD 0,1 OR 63) OTHERS 0 |
| TRANSPORT PRIORITY | 1 | | 0 |
| PID | 13 | | VIDEO:1000H AUDIO:1001H CRCC:1002H |
| TRANSPORT SCRAMBLING CONTROL | 2 | 1 | 00 |
| SDAPTATION FIEL CONTROL | 2 | | 01 |
| CONTINUITY COUNTER | 4 | | REPETITION OF 0H TO FH |

Fig.24

| LABEL NAME | NUMBER OF BIT(S) | NUMBER OF BYTE(S) | DATA CONTENT |
|---|---|---|---|
| PACKET START CODE PREFIX | 24 | 3 | |
| STREAM ID | 8 | 1 | AUDIO:CRCC: BDH<br>VIDEO:E0H |
| PES PACKET LENGTH | 16 | 2 | AUDIO:(525):1CC0H<br>AUDIO:(625):2280H<br>VIDEO:000H<br>CRCC:(525):0730H<br>CRCC:(625):08A0H |
| "10" | 2 | 1 | 10 |
| PES SCRAMBLING CONTROL | 2 | | 00 |
| PES PRIORITY | 1 | | 0 |
| DATA ALIGNMENT INDICATOR | 1 | | 0 |
| COPYRIGHT | 1 | | 0 |
| ORIGINAL OR COPY | 1 | | 0 |
| PTS DTS FLAGS | 1 | 1 | 10 |
| ESCR FLAG | 1 | | 0 |
| ES RATE FLAG | 1 | | 0 |
| DSM TRICK MODE FLAG | 1 | | 0 |
| ADDITIONAL COPY INFO FLAG | 1 | | 0 |
| PES CRC FLAG | 1 | | 0 |
| PES EXTENSION FLAG | 1 | | 1 |
| PES HEADER DATA LENGTH | 8 | 1 | 16H |
| "0010" | 4 | 1 | 0010 |
| PTS[32···30] | 3 | | ※ TIMECODE |
| MARKER BIT | 1 | | 1 |
| PTS[29···15] | 15 | 2 | ※ TIMECODE |
| MARKER BIT | 1 | | 1 |
| PTS[14···0] | 15 | 2 | ※ TIMECODE |
| MARKER BIT | 1 | | 1 |
| PES PRIVATE DATA FLAG | 1 | 1 | 1 |
| PACK HEADER FIALD FLAG | 1 | | 0 |
| PROGRAM PACKET SEQUENCE COUNTER FLAG | 1 | | 0 |
| P-STD BUFFER FLAG | 1 | | 0 |
| RESERVED | 3 | | 111 |
| PES-SXTENSION FLAG 2 | 1 | | 0 |
| PES PRIVATE DATA | 128 | 16 | ※2 ALL "1" S |

DATA TRANSMISSION/RECEPTION METHOD AND APPARATUS THEREOF

BACKGROUND OF THE INVENTION

1. Field of the Invention

The present invention relates to a data transmission/reception method and apparatus thereof that is MPEG-2 based, transmitting and receiving input data, including at least video and audio data dependent upon the MPEG-2 standard. Wherein, the input data may also include "user data" containing "system data", an "error correction code", an "error detection code", and other related connections. The audio data is not limited to "uncompressed audio data", extending to "audio data, not dependent upon the MPEG-2 standard".

Note that the MPEG-2 stands for "Moving Picture Experts Group 2", and is a world-wide standard, in terms of image compression.

2. Description of the Related Art

The conventional MPEG-2 based transmission/reception of MPEG-2 based video data(hereafter, referred to as merely "video data"), uncompressed audio data, and user data are constructed in the following fashion: First, a transport stream is directly fabricated from a PES stream of the video data; another transport stream is then fabricated from a PES private stream of the uncompressed audio data; and yet another transport stream is fabricated from a PES private stream of the user data. Secondly, the fabricated transport streams are multiplexed sent and received.

"PES" stands for "Packetized Elementary Stream", denoting a data stream such as packetized video/audio data, the format of which is defined in the MPEG-2 standard. The "PES stream" denotes a PES data stream, the format of which is defined in the MPEG-2 standard. The "transport stream" denotes a stream mainly used in a transmission system, the format of which is also defined in the MPEG-2 standard. The "PES private stream" denotes a user-usable data stream, defined in the MPEG-2 standard.

In addition, an error correction code and an error detection code, unique to a recording apparatus, may be attached as user data to video data. In this case, since the combination of the video data, the error correction code, and the error detection code is against the MPEG-2 standard, they are conventionally transmitted and received by being put into a PES private stream, and a transport stream is then fabricated with the PES private stream.

Furthermore, in a data transmission/reception apparatus handling both the 525/59.94 component signal and the 625/50 component signal, different transport streams are fabricated with respective PES private streams for the component signals. Wherein, the "525/59.94 component signal" denotes a component video signal dependent upon the NTSC(National Television System Committee) color system, with 525 lines and a field frequency of 59.94 Hz. More specifically, it includes three primary-color signals of R(Red), G(Green), and B(Blue). Alternatively, it includes a luminance signal(Y) and color difference signals(Cb and Cr). Note that hereafter the "525/59.94 component signal may be referred to as merely a "525 signal". The "625/50 component signal" denotes a component video signal dependent upon the NTSC color system, with 625 lines and a field frequency of 50 Hz. Like the 525/59.94 component signal, the 625/50 component signal includes three primary-color signals of R(Red), G(Green), and B(Blue). Alternatively, it includes a luminance signal(Y) and color differential signals (Cb and Cr). Note that hereafter the "625/50 component signal may be referred to as simply a "625 signal", In the conventional technologies, the ratios of video data, uncompressed audio data, and user data to a frame of video data are not fixed. Moreover, their locations to the frame are also not fixed. In addition, detection of a transport header is made, however it is not protected.

Many earlier technologies relevant to the present invention are disclosed. For example, Laid-open Hei-7-30854 (hereafter, referred to as reference 1) describes an "image signal encoding apparatus" minimizing possible degradation of an encoded image quality, with a superior error-proof characteristic. Reference 1 describes: an image preprocessing unit that converts an image signal into an image signal with the format suitable for a low bit rate coding method; and an image coding unit that MPEG-based-encodes the converted image into the resulting encoded image data. A time-series data conversion unit then changes the time-series order of the encoded data into another, leading to decrease a possible encoding-error propagating area. Subsequently, a channel encoding unit attaches an error correction code, transmitting and recording the resultant data onto a transmission/recording medium. In regards to the conventional approaches, the possible encoding-error propagating area will be drastically reduced. This enables for successful fabrication of an image coding apparatus with a low bit rate coding and a high error-proof characteristic.

Laid-open Hei-5-119788 (hereafter, referred to as reference 2) discloses a "transmission/reception apparatus" exactly reproducing audio data and image data, which has external noise-proof and robust against a low transmission cable quality. According to the reference 2, a RF modulation circuit of a transmission unit 2PSK-modulates reproduced and EFM-encoded sound data, image data, and time data, digitally transmitting them to a reception unit, via a transmission line. A RF demodulation circuit of the reception unit 2PSK-demodulates the transmitted sound data. An EFM decoder then RFM-demodulates the resulting demodulated sound data, correcting for error and de-interleaving it. Since transmitted data is digital data, it can be safely transmitted even though the quality of the transmission line is low. In addition, even though an external noise may have negative influence on the data, it will be exactly reproduced by EFM-demodulating, correcting for error, and de-interleaving the influenced data by the aforementioned EFM-decoder.

Laid-open Hei-4-79588 (hereafter, referred to as reference 3) discloses a "digital transmitted data signal processing apparatus and recording/reproduction apparatus", which can record an image and sound signals with a single format for both a high-speed recording and a normal-speed recording, on a magnetic tape by the following manner: First, the image and sound signals are compressed in their time axes. It is then compressed in terms of their bit length. Thirdly, a parity signal is attached to them. Lastly, they are subjected to modulation-processing, and then transmitted. According to the reference 3, the output signal of a compression circuit is received by a parity attachment circuit, in which the output signal is subjected to signal-processing such as attaching an error correction parity signal and outputting in serial order the resulting parity attached image and sound signals with a given transmission format, to a modulation circuit. The modulation circuit then modulates the serial signal in accordance with the characteristics of a transmission line, and the frequency band. For example, in the case of transmission via an electric radio wave, the signal is subjected to four-phase modulation (QPSK-modulation). A transmission circuit then outputs the resultant modulated signal to a transmission channel. Therefore, high-speed recording with a format identical to that of normal-speed recording, is allowed to be recorded onto the magnetic tape.

According to the aforementioned conventional technologies, for a MPEG-2 based transmission/reception of MPEG-2 based video data, uncompressed audio data, and user data, a problem exists where there is difficulty in identifying the uncompressed audio data and user data, since both the uncompressed audio data and the user data are PES private streams.

In addition, when an error correction code, an error detection code, and the other related connections unique to a recording apparatus, are attached to video data, they are combined into a PES private stream. A transport stream is then fabricated from the transmitted/received PES stream. In this case, a problem arises when the video data separated from a received data cannot be identified as MPEG-2 based video data, and when it is not able to be decoded.

Furthermore, since different transport streams are fabricated for the 525/59.94 component signal and the 625/50 component signal, respectively, corresponding different independent circuits are required.

Additionally, the ratios of video data, uncompressed audio data, user data to a frame of video data, and their locations to the frame are not fixed. Therefore, an identification circuit to identify the received data as video or uncompressed data is required.

Furthermore, since protection of a transport header is not made, it is impossible to decode compressed video data when the transport header has not been detected at least once, owing to a possible occurrence of a code error or other related errors during transmission. This problem may cause long time error propagation for the subsequent bits.

The aforementioned references 1 to 3 involve the following problems: First, according to the reference 1, no more than an image signal is processed. Thus, the reference 1 has a completely different technological idea from that of the present invention allowing to transmit/receive uncompressed audio data and user data as well as compressed video data. Secondly, according to the reference 2, not only image data but also sound data and time data is handled. However, this data is reproduced by the CD-I, and EFM-encoded. Therefore, The technological idea of reference 2 is quite different from the present invention handling MPEG based compressed video data. Lastly, according to the reference 3, the technology of compressing a digital image signal and a digital sound signal in their time axes, and bit-compressing them, is disclosed. However, no technology of MPEG-2-basis-compressing video data is disclosed. In addition, the compression approach of the reference 3 is quite different from that of the present invention.

SUMMARY OF THE INVENTION

Accordingly, the primary objective of the present invention is to provide a data transmission/reception method and apparatus, which will MPEG-2-basis-transmit and -receive digital video/audio/user data to and from a recording medium, such as an optical disk decoder, achieved with high efficiency and a low rate of error.

Further objectives of the present invention are as follows:

To provide a data transmission/reception apparatus for identifying audio data and user data.

To provide a data transmission/reception apparatus for successfully decoding video data even though an error correction code and an error detection code unique to a recording apparatus are attached to the video data.

To provide a data transmission/reception apparatus, which utilizes the same circuit for processing the 525/59.94 component signal and the 625/50 component signal.

To provide a data transmission/reception apparatus for identifying a received data as video data, audio data, or user data.

To provide a data transmission/reception apparatus for safely receiving a transport header even though the transport header cannot be detected owing to a possible occurrence of a code error during transmission.

According to an aspect of the present invention, a data transmission apparatus, which receives input data including at least MPEG-2 based video data and audio data, and transmitting the resultant transmission data, comprising: separation means for separating the input data into MPEG-2 based video data and audio data; first temporary memory circuit for storing the MPEG-2 based video data separated by the separation circuit, as the first data stored, and reading out the first data stored, as the first out-read data; second temporary memory circuit for storing the audio data separated from the separation means as the second data stored, and reading out the second data stored, as a second out-read data; combination circuit for combining the first out-read data and the second out-read data, and outputting the resultant combined data; PES private data attachment circuit for attaching a PES private data to the combined data, outputting the first attached data; PTS generation/attachment circuit for generation of a presentation time stamp PTS, attaching the presentation time stamp to the first attached data, outputting the resulting second attached data; PES header attachment circuit for attaching a PES header to the second attached data, outputting the resultant third attached data; transport header attachment circuit for attaching a transport header to the third attached data, outputting the resultant fourth attached data; a means for transmitting the fourth attached data, as transmission data.

As for the aforementioned data transmission apparatus, the received data may be made up of just MPEG-2 based video data and audio data. In this case, the third temporary memory circuit will not be necessary. In addition, the PTS generation/attachment circuit can also be omitted. Accordingly, the first attached data will be transmitted, as a second attached data, from the PES private data attachment circuit to the PES header attachment circuit.

According to an aspect of the present invention, a data reception apparatus, which receives transmission data, as received data, transmitted from the aforementioned data transmission apparatus, and outputting the resultant output data, comprising: transport header separation circuit for separating a transport header from the received data, outputting the resultant first separated data; PES header separation circuit for separating a PES header from the first separated data, outputting the resultant second separated data; PTS detection circuit for detecting a presentation time stamp PTS from the second separated data, outputting the resultant third separated data; PES private data separation circuit for separating a PES private data from the third separated data, outputting the resultant fourth separated data; separation means for separating a MPEG-2 based video data and audio data from the fourth separated data; first temporary memory circuit for storing the MPEG-2 based video data, as the first data stored, separated by the separation means, and reading out the first data stored, as the first out-read data; second temporary memory circuit for storing the audio data separated, as the second data stored, by the separation circuit, and reading out the second memory data, as a second out-read data; combination circuit for combining the first out-read data and the second out-read data together, and outputting the resultant combined data; means for outputting the combined data as output data.

As for the aforementioned data reception apparatus, when the data received by the data transmission apparatus is made up of only MPEG-2 based video data and audio data, the third temporary memory circuit can be omitted. In addition, the PTS detection circuit can also be omitted. Accordingly, the second attached data will be transmitted as the third attached data, from the PES header separation circuit to the PES private data separation circuit.

As an example, the aforementioned user data includes system data, an error correction code, and an error detection code, as in the following example:

Furthermore, letting LA, LB, LC, LD, and LE be: the length of the first PES stream made up of MPEG-2 based video data; the length of a second PES stream made up of the MPEG-2 based audio data; the length of a third PES stream made up of the aforementioned system data; the length of a fourth PES stream made up of the aforementioned error correction code; and the length of a fifth PES stream made up of the aforementioned error detection code, each of the LA, LB, LC, LD, and LE are preferably fixed for the 525/59.94 component signal and the 625/50 component signal.

Placing the first PES stream made up of MPEG-2 based video data; a second PES stream made up of the MPEG-2 based audio data; a third PES stream made up of the aforementioned system data; a fourth PES stream made up of the aforementioned error correction code; and a fifth PES stream made up of the aforementioned error detection code, on addresses PA, PB, PC, PD, and PE from the start of a frame respectively, the addresses PA, PB, PC, PD, and PE are preferably fixed for the 525/59.94 component signal and the 625/50 component signal.

Furthermore, the aforementioned error correction code and error detection code are attached for a data recording. They are preferably transmitted via a PES private stream.

Additionally, the locations of the aforementioned, MPEG-2 based video data, audio data, system data, error correction code, and error detection code are all preferably fixed to the frame synchronization. This can be attained by locking a transmission clock to a frame of the MPEG-2 based video data, and fixing the locations of the start and end of a frame, and the location of the end of a MPEG-2 based transport stream corresponding to a single frame for the 525/59.94 component signal and the 625/50 component signal.

The stream numbers for the MPEG-2 based video data, the audio data, the system data, the error correction code, and the error detection code are all preferably fixed. This can be attained by/with the transmission clock unlocking to a frame of the MPEG-2 based video data, starting a data transmission corresponding to a next frame at the beginning of a MPEG-2 transport stream of the 525/59.94 component signal and the 625/50 component signal just after the next frame starts.

A flag indicating each of the MPEG-2 based video data, the audio data, the system data, the error correction code, and the error detection code is preferably attached to the PES private data.

Furthermore, the transport header separation circuit preferably includes a transport header protection circuit to protect the transport header.

With the aforementioned configurations according to the present invention, the following results will be obtained:

For MPEG-2 based transmission/reception of video data, audio data (uncompressed audio data and compressed audio data not dependent upon the MPEG-2 standard), and user data, the audio data and the user data will be identified by transmitting a corresponding discriminant flag in the PES private data.

Video data dependent upon the MPEG-2 standard, in which an error correction code, an error detection code, and other related connections unique to a recording apparatus are attached to, will be directly decoded by a MPEG-2 decoder in the following method: First, separation is performed. Secondly, MPEG-2 based video data is put in a PES stream, while the error correction code, the error detection code, and the other related connections are put in a PES private stream. Thirdly, the PES and PES private streams are transmitted or received via another packet in the transport stream. Lastly, the resultant received data is subjected to error correction and error detection. This enables the MPEG-2 decoder to directly decode the MPEG-2 based video data.

The 525/59.94 component signal and the 625/50 component signal will be both processed through the same circuit. This can be realized by setting the frame frequency of the 625/50 component signal to be (5.005/6) times that of the 525/59.94 component signal, and the processing bit number per a frame of the former to be (6/5.005) times that of the latter, changing over between the two frame frequencies and processing bit numbers per a frame.

Received data will be identified as MPEG-2 based video data, audio data, or user data. This is achieved by fixing the occurred ratios of video data, audio data, and user data each to a frame of video data, and the location to the frame, for the 525/59.94 component signal and the 625/50 component signal.

The probability of an error occurring in the received data and its propagation will be drastically reduced by protecting the transport header. Protection enables for successful acquisition of the transport header, even though the possible-occurrence code transmission error prevents detection of the transport header.

BRIEF DESCRIPTION OF THE DRAWINGS

Other features and advantages of the invention will be made more apparent by the detailed description hereunder, taken in conjunction with the accompanying drawings, wherein:

FIG. 23 shows an example format of a transport header; and

FIG. 24 shows an example format of a PES header.

DETAILED DESCRIPTION OF THE PREFERRED EMBODIMENTS

Embodiments of the present invention will be described in detail hereafter with reference to the drawings.

Figure 1:
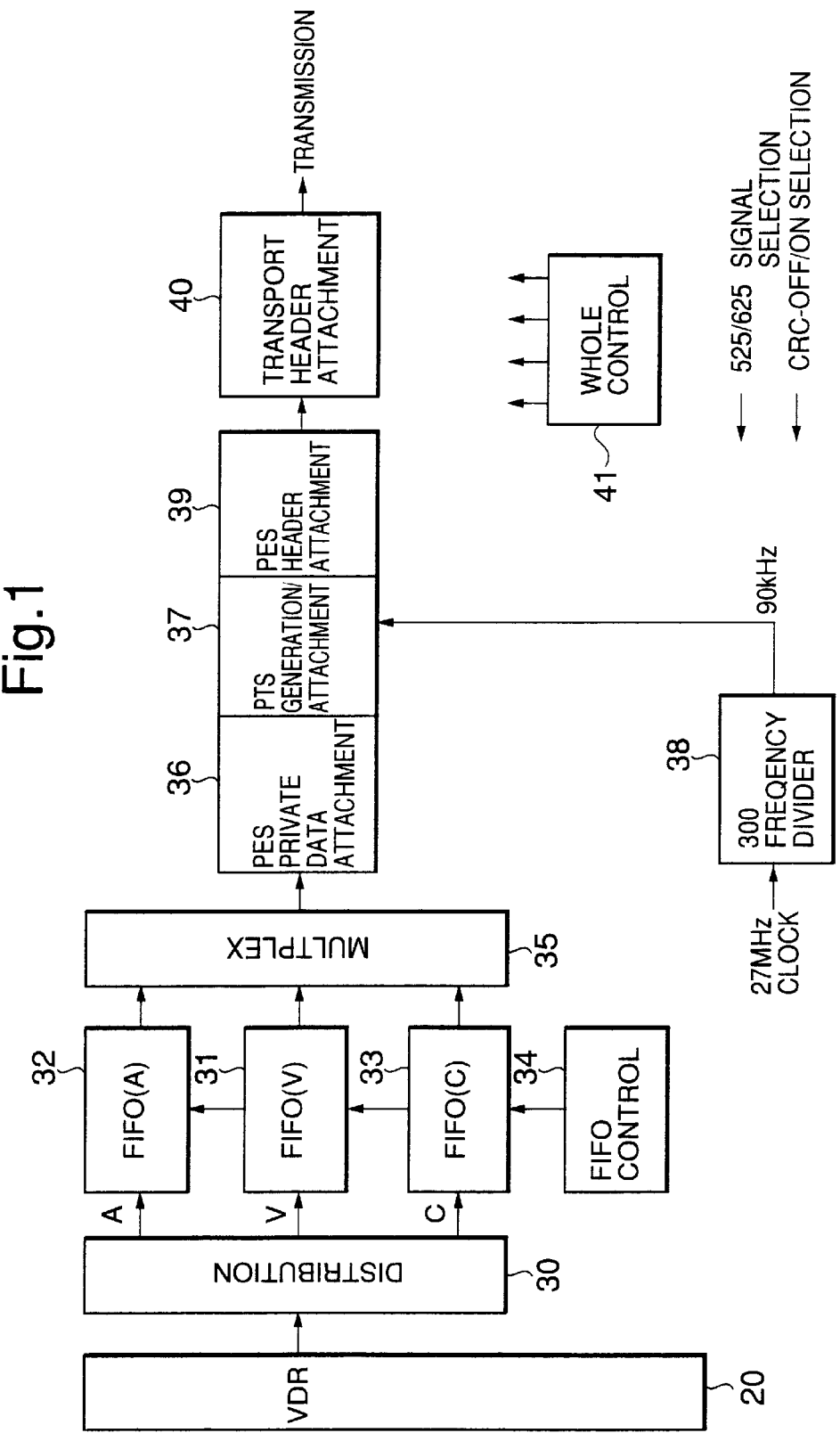
FIG. 1 shows the configuration of a data transmission apparatus (the transmission section of a MPEG-2 digital interface apparatus) of an embodiment according to the present invention.
Figure 2:
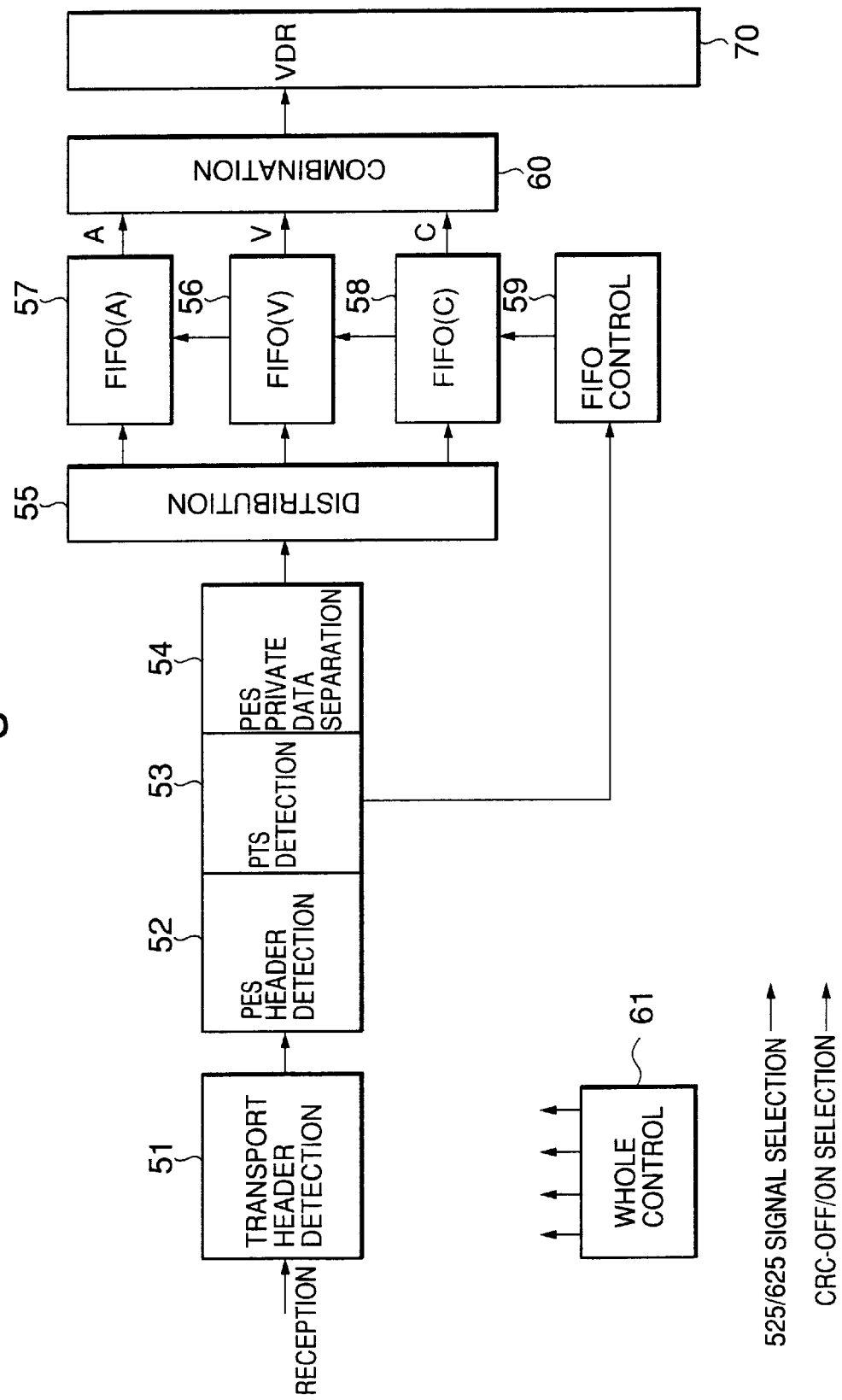
FIG. 2 shows the configuration of a data reception apparatus (the reception section of a MPEG-2 digital interface apparatus)

FIGS. 1 and 2 show a data transmission apparatus and a data reception apparatus of the embodiments according to the present invention, respectively. The data transmission apparatus shown in FIG. 1 receives MPEG-2 based video data, uncompressed audio data, and CRCC error detection data, transmitting them as transmission data. The data reception apparatus shown in FIG. 2 receives the data from the data transmission apparatus in FIG. 1, transmitting output data.

FIGS. 1 and 2 show example configurations of where uncompressed audio data will be processed. Compressed data not dependent upon the MPEG-2 standard and can be processed with these configurations. The CRCC error detection data, the system data, the error correction code, and the error detection code are all categorized in user data. The "CRCC" stands for "Cyclic Redundancy Check Code", which is one of the error detection codes.

As shown in FIG. 1, the data transmission apparatus is made up of a distribution circuit 30, the first to a third FIFO(First In First Out) circuits 31, 32, and 33, a FIFO control circuit 34, a multiplex circuit 35, a PES private data attachment circuit 36, a PTS generation/attachment circuit 37, a 300 frequency divider 38, a PES header attachment circuit 39, a transport header attachment circuit 400, and a whole control circuit 41.

The distribution circuit 30 divides input data into MPEG-2 based video data, uncompressed audio data, and CRCC error detection data. The first FIFO circuit 31 plays the role of the first temporary memory circuit. Specifically, it stores the MPEG-2 based video data (V), as the first data stored, reading out the first data stored(hereafter, the out-read data is referred to as the first out-read data). The second FIFO 32 plays the role of a second memory circuit. Specifically, it stores the uncompressed data (A) as a second data stored, extracted by the distribution circuit 30, reading out the second data stored (hereafter, the out-read data is referred to as a second out-read data). The third FIFO circuit 33 plays the role of the third memory circuit. Specifically, it stores the CRCC error detection data (C) extracted by the distribution circuit 30, reading out the third data stored (hereafter, the out-read data is referred to as the third out-read data). The FIFO control circuit 34 controls the operations of the first to third FIFO circuits 31 to 33. Specifically, the first to third FIFO circuits 31 to 33 and the FIFO control circuit 34 are prepared to synchronize the out-read timing for the MPEG-2 based video data (V), the uncompressed audio data (A), and the CRCC error detection data (C) all extracted by the distribution circuit 30, being transferred into the multiplex circuit 35.

The multiplex circuit 35 combines; the first out-read data, the second out-read data, and the third out-read data, outputting the resulting combined data. The PES private data attachment circuit 36 attaches a PES private data to the combined data, outputting the first attached data. The PTS generation/attachment circuit 37 generates a PTS (Presentation Time Stamp), attaching the PTS to the first attached data, then outputting the resulting second attached data. A frequency-divided clock of 90 kHz is supplied to the PTS generation/attachment circuit 37 by the 300 frequency division circuit 38. The PTS generation/attachment circuit 37 acts in synchronism with the frequency-divided clock signal. A reference clock signal of 27 MHz is supplied to the 300 frequency division circuit 38. The PES header circuit 39 attaches a PES header to the second attached data, outputting the resultant third attached data. The transport header attachment circuit 40 attaches a transport header to the third attached data, outputting the resultant fourth attachment data. The fourth attached data is then sent to a data reception apparatus shown in FIG. 2. The whole control circuit 41 controls the entire circuit.

As shown in FIG. 2, the data reception apparatus is comprised of a transport header detection circuit 51, a PES header detection circuit 52, a PTS detection circuit 53, a PES private data separation circuit 54, a distribution circuit 55, first to third FIFO circuits 56, 57, and 58, a combination circuit 60, and a whole control circuit 61.

The transport header detection circuit 51 separates a transport header from a received data, outputting the resulting first separated data. The PES header detection circuit 52 separates a PES header from the first separated data, outputting the resulting second separated data. The PTS detection circuit 53 detects a PTS from the second separated data, outputting the resultant third separated data. The PTS detection circuit 53 provides the detected signal(PTS) for the FIFO control circuit 59. The distribution circuit 55 plays the role of separating the third separated data into a MPEG-2 based video data (V), a uncompressed audio data (A), and a CRCC error detection data (C).

The first FIFO circuit 56 plays the role of the first temporary memory circuit. Specifically, it stores the MPEG-2 based video data distributed from the distribution circuit 55, as the first data stored, reading out the first data stored as the first out-read data. The second FIFO circuit 57 plays the role of a second temporary memory circuit.

Specifically, it stores the uncompressed audio data (A), as the second data stored, distributed from the distribution circuit 55, reading out the second data stored, as the second out-read data. The third FIFO circuit 58 plays the role of the third temporary memory circuit. Specifically, it stores the CRCC error detection data as the third data stored, distributed from the distribution circuit 55, reading out the third data stored, as the third out-read data. The FIFO control circuit 59 controls the operations of the first to third FIFO circuits 56 to 58. The combination circuit 60 combines the first out-read data, the second out-read data, and the third out-read data altogether, outputting the resultant combined data. The combined data is provided as output data for the video disk recorder(VDR) 70. The whole control circuit 61 controls the operation of the aforementioned whole circuit.

Figure 3:
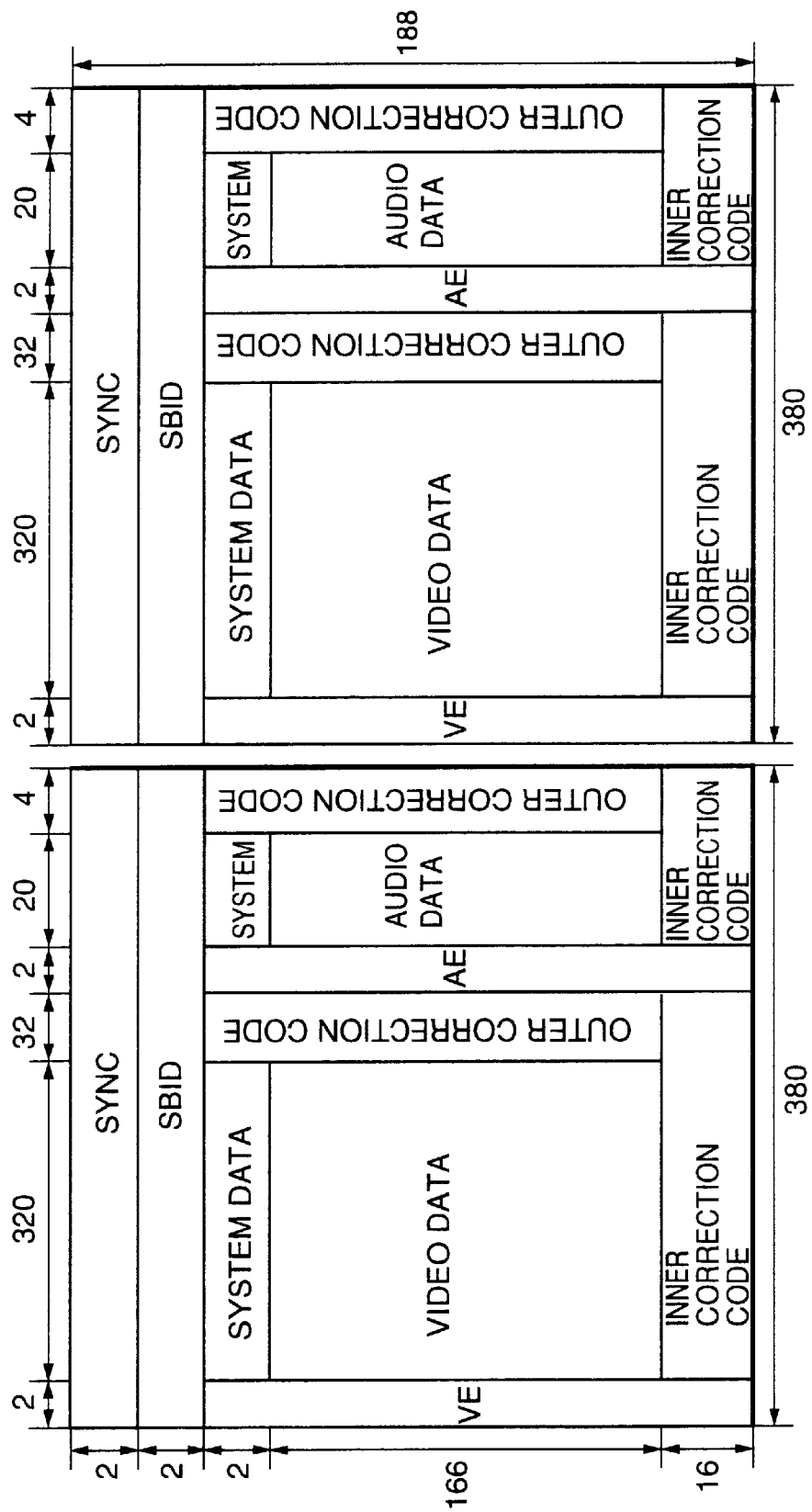
FIG. 3 shows the format of video/audio data in a CRC-OFF and 525 signals mode, stored in a video disk recorder.
Figure 4:
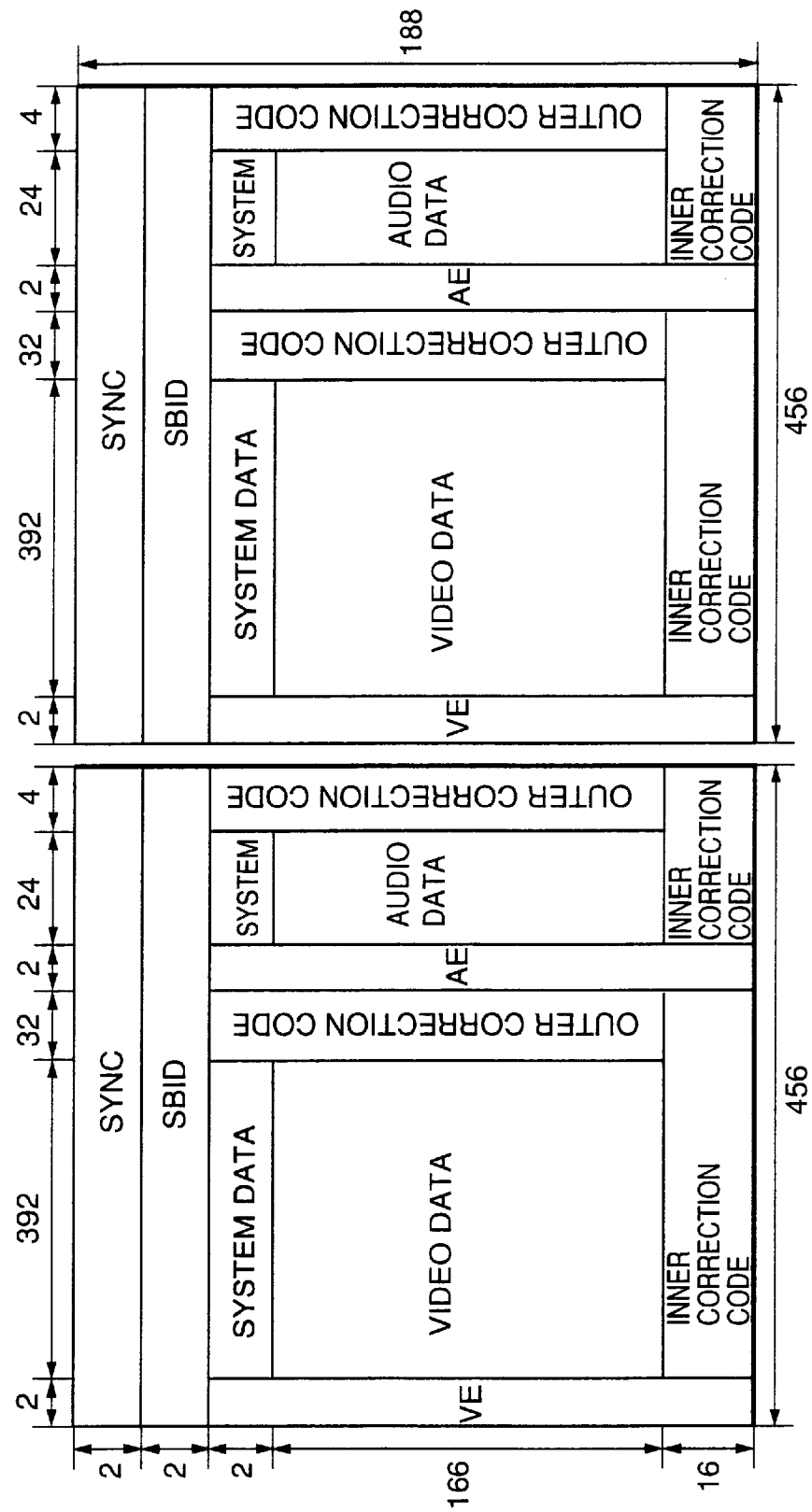
FIG. 4 shows the format of video/audio data in a CRC-OFF and 625 signals mode, stored in the video disk recorder.
Figure 5:
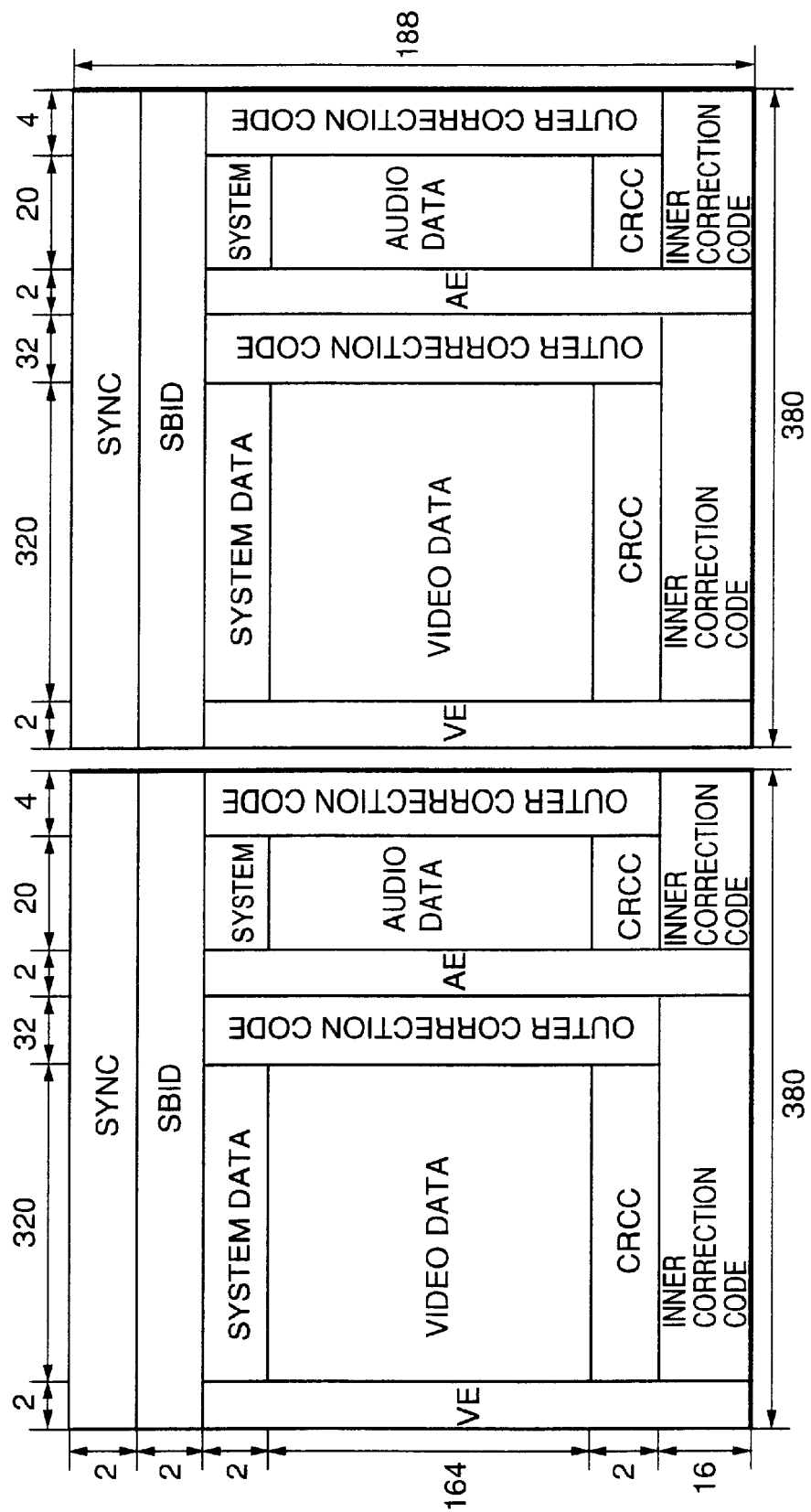
FIG. 5 shows the format of video/audio data in a CRC-ON and 525 signals mode, stored in the video disk recorder.
Figure 6:
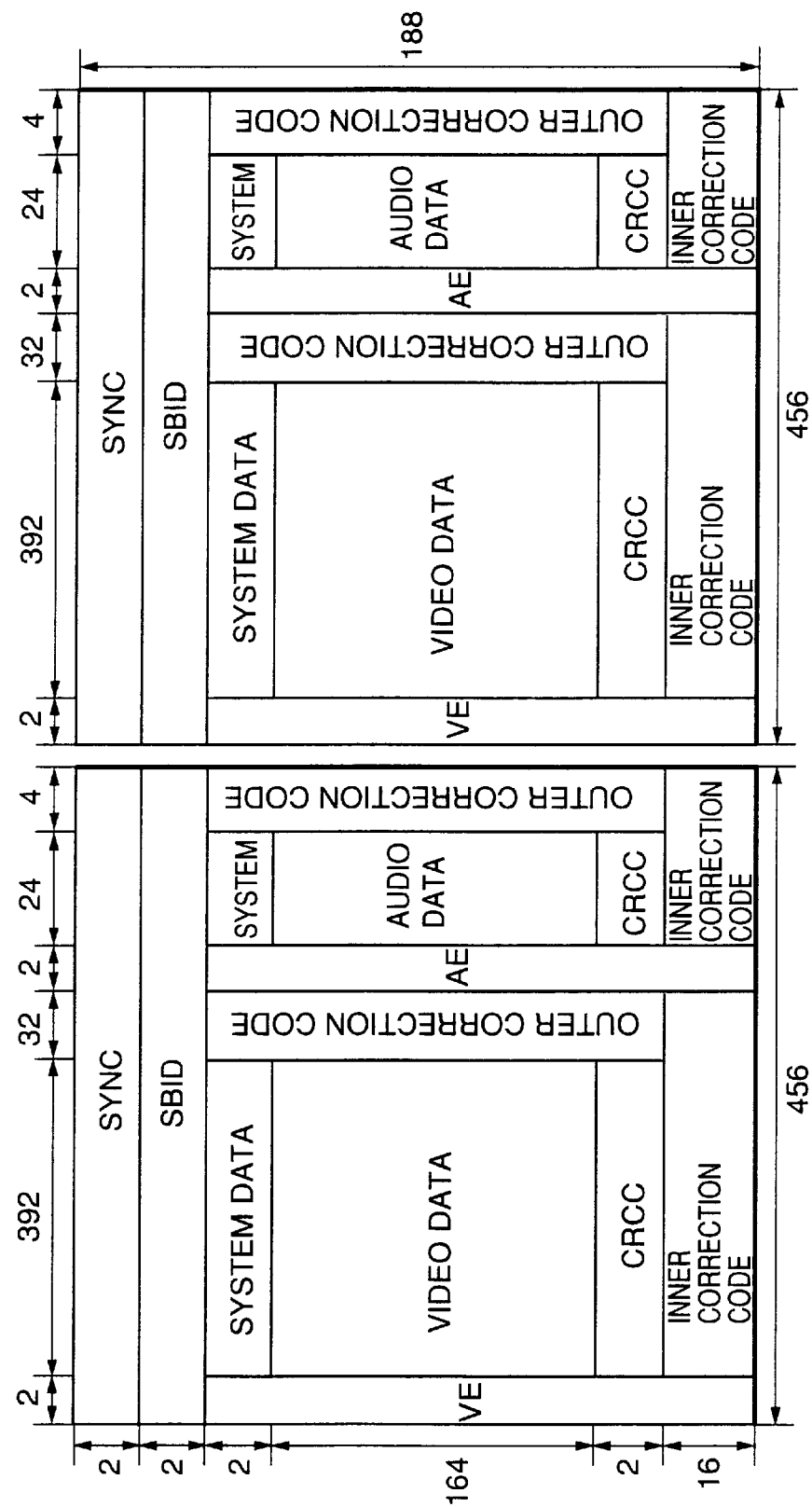
FIG. 6 shows the format of video/audio data in a CRC-ON and 625 signals mode, stored in the video disk recorder.

FIGS. 3 to 6 illustrate shuffled maps in terms of an example of recording data stored in the VDR. FIG. 3 illustrates a format of single data frame in a CRC-OFF and 525 signals mode. FIG. 4 shows a format of single frame data in the CRC-OFF and 625 signals mode. FIG. 5 illustrates the same in a CRC-ON (meaning that the CRC is used) and 525 signals mode. FIG. 6 shows the same in a CRC-ON and 625 signals mode. Wherein, CRC-OFF means that a CRCC(Cyclic Redundancy Check Code) is not used. On the other hand, the CRC-ON means that the CRCC is used.

In FIGS. 3 to 6, "SYNC" denotes a synchronization signal for recording; "SBID(Sync Block Identity Code)" denotes an identification code for recording an address in other related connections in every sync block (a recording unit); "SYSTEM DATA" denotes a user data such as a program data; "VE(Video Edit)" denotes a spare area for video data overflow recording; "AE(Audio Edit)" denotes a spare area for audio data overflow recording; "CRCC" denotes a cyclic redundancy code as described earlier; and "OUTER CORRECTION CODE" and "INNER CORRECTION CODE" both denote error correction codes, respectively.

Furthermore, in FIGS. 3 to 6, the vertical line (i.e., a shorter side) of the format is referred to as a "sync block". A single sync block is made up of 188 bytes. In the 525 signals mode, a single frame is made up of 760 sync block(380×2). On the other hand, in the 625 signals mode, a single frame is made up of 912 sync blocks(456×2). The ratio of them is 5:6. As shown in FIGS. 3 and 4, video data or audio data is made up of 166 bytes in the CRC-OFF mode. Otherwise, in the CRC-ON mode, it is made up of 164 bytes, as shown in FIGS. 5 and 6. Note that the CRCC in the CRC-ON mode is made up of two bytes, as shown in FIGS. 5 and 6.

Figure 7:
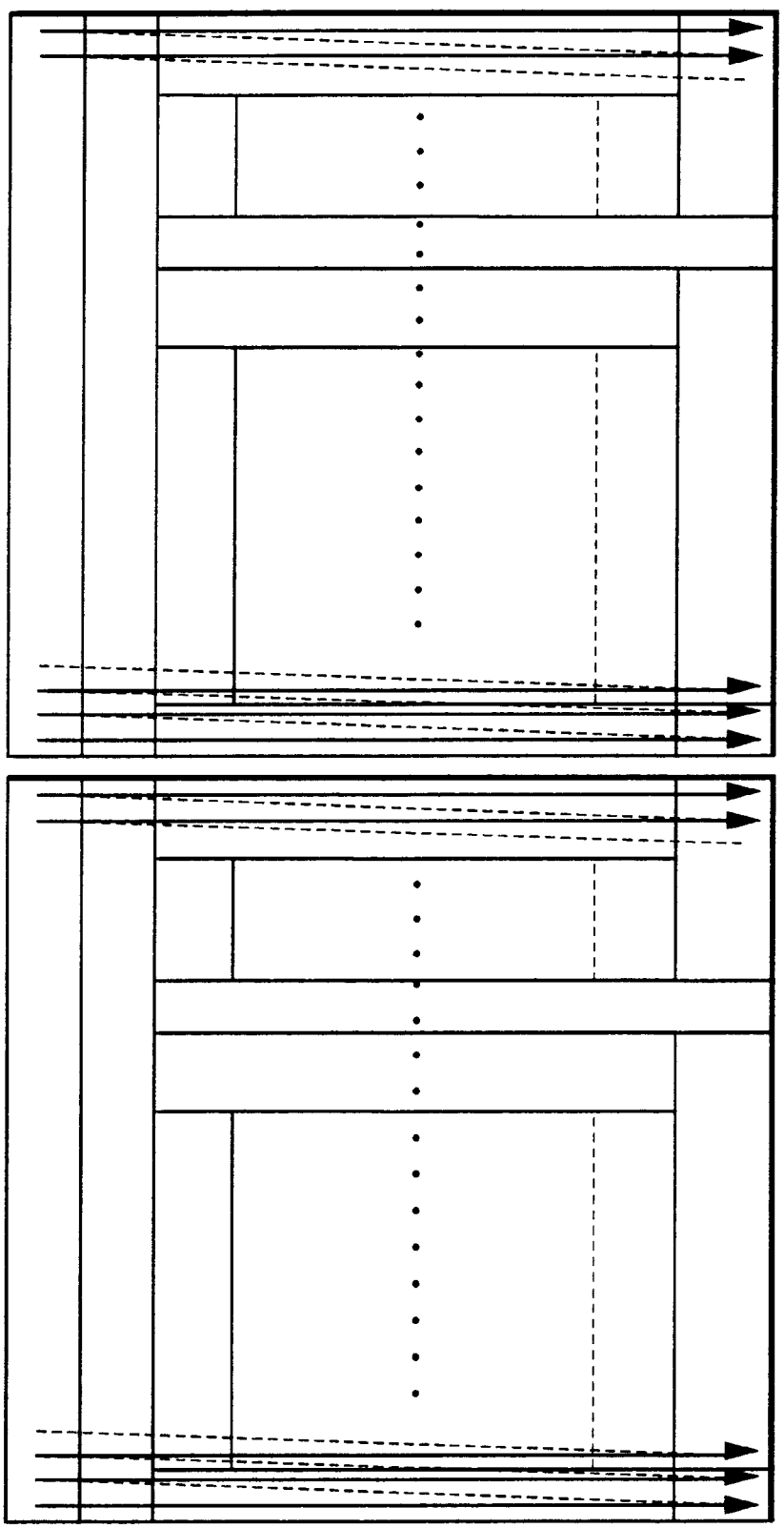
FIG. 7 shows the scanning order for recording/reproduction by the video disk recorder.

In FIG. 7, the order of recording data (shown in FIGS. 3 to 6) onto the VDR is shown. The order in the CRC-OFF mode, the CRC-ON mode, 525 signals mode, and 625 signals mode is also the same. As shown in FIG. 7, the whole 760-byte sync block is recorded in the order and orientation that several arrows show, in the 525 signals mode. Otherwise, the whole 912 sync block is recorded in the 625 signals mode.

Figure 8:
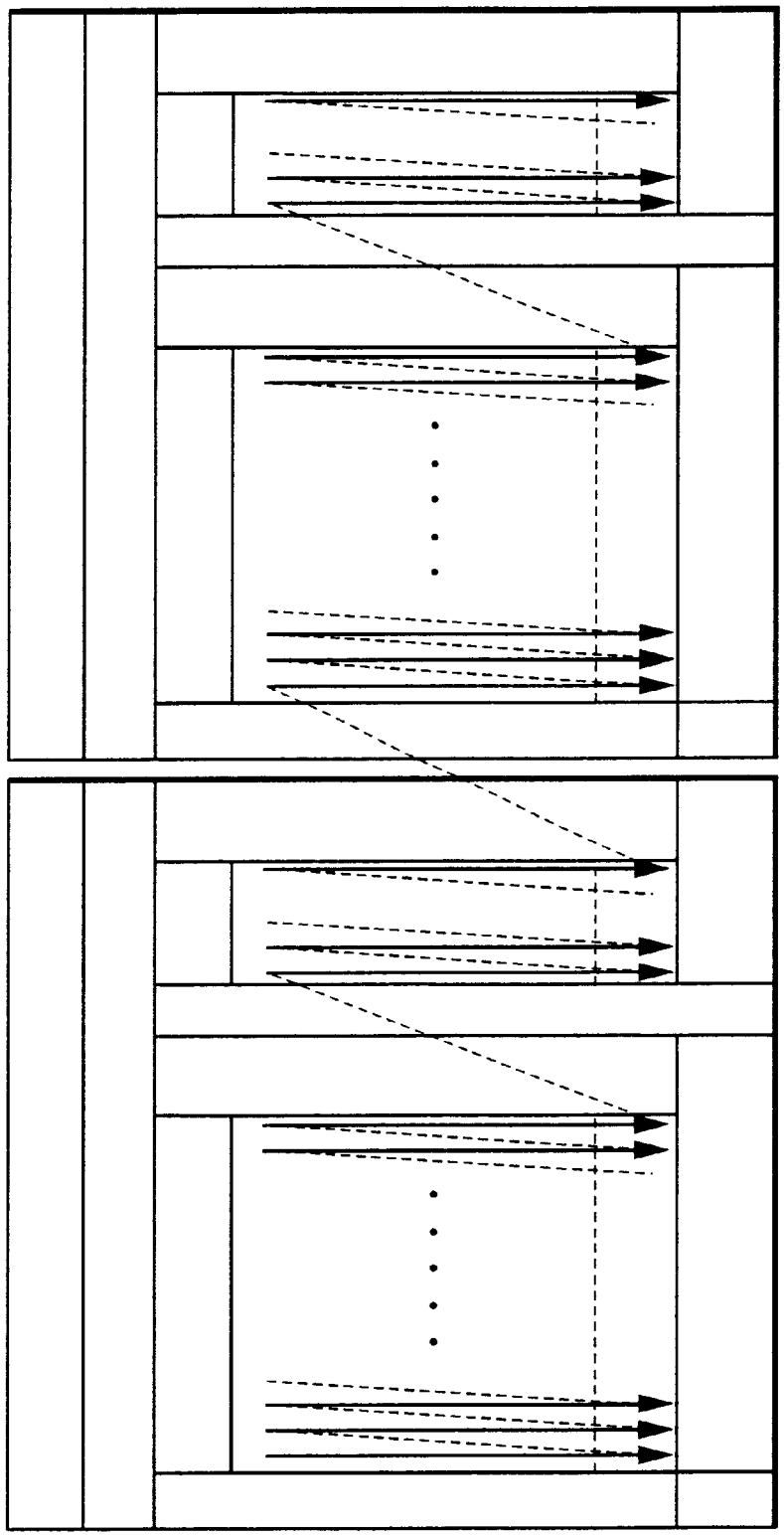
FIG. 8 shows a data transmission order in a video disk recorder interface.

FIG. 8 shows the order of transmitting data (shown in FIGS. 3 to 6) from the VDR to an interface apparatus(not shown), and vice versa.

In the CRC-OFF and 525 signals mode shown in FIG. 3, data is transmitted in the following order: video data(166 bytes×320)->audio data(166 bytes×20)->video data(166 bytes×320)->audio data(166 bytes×20). In the CRC-OFF and 625 signals mode shown in FIG. 4, data is transmitted in the following order: video data(166 bytes×392)->audio data(166 bytes×24)->video data(166 bytes×392)->audio data(166 bytes×24).

In the CRC-ON and 525 signals mode shown in FIG. 5, data is transmitted in the following order: [320 times repetition of both video data(164 bytes) and CRC(two bytes)]->[twenty times repetition of both audio data(164 bytes) and CRC(two bytes)]->[320 times repetition of both video data (164 bytes) and CRC(two bytes)]->[twenty times repetition of both audio data(164 bytes) and CRC(two bytes)]. In the CRC-ON and 625 signals mode shown in FIG. 6, data is transmitted in the following order: [392 times repetition of both video data(164 bytes) and CRC(two bytes)]->[twenty four times repetition of both audio data(164 bytes) and CRC(two bytes)]->[392 times repetition of both video data (164 bytes) and CRC(two bytes)]->[twenty four times repetition of both audio data(164 bytes) and CRC(two bytes)].

Next, the transmission operation of the data transmission apparatus (see FIG. 1) in the CRC-OFF and 525 signals mode (see FIG. 3) will be described hereafter.

First, video/audio data is received from the VDR 20. The video data, specifically, the video elementary stream dependent upon the MPEG-2 standard is received in a half frame unit(53,120 bytes unit) in such a manner shown in FIGS. 3 and 8. The format of the video elementary stream is defined in the MPEG-2 standard. The audio data, specifically, the uncompressed data is received in a half frame unit(3320 bytes unit) in the following order in a single frame: the first half of the frame (video data (53120 bytes)->audio data (3320 bytes)), and then the second half of the frame (video data(53,120 bytes)->audio data(3320 bytes)).

Secondly, the received video/audio data is separated into video data (V) and audio data (A) by the division circuit 30. The video data is stored, as the first data stored, in the first FIFO circuit 31, while the audio data is stored, as the second data stored, in the second FIFO circuit 32. The third FIFO circuit 33 is not used in the mode.

Thirdly, the video data and the audio data are combined together by the combination circuit 35. As describing more in detail, the second out-read data (audio data) read out from the second FIFO circuit 32 is placed in a PES private stream, while the first out-read data (video data) read out from the first FIFO circuit 31 is placed in a PES packet data byte. Wherein, the PES private stream denotes a data stream that a user can use privately, the format of which is defined in the MPEG-2 standard. The PES packet data byte denotes a byte data in the PES, the format of which is also defined in the MPEG-2 standard. In conclusion, the combination circuit 35 combines the first and second out-read data (video and audio data) together, outputting the resultant combined data.

The PES private data attachment circuit 36 attaches a PES private data to the combined data into the first attached data. Wherein, the PES private data denotes user usable data, the format of which is defined in the MPEG-2 standard. The PTS generation/attachment circuit 37 then attaches a PTS to the first attached data into a second attached data. Wherein, the PTS stands for "Presentation Time Stamp", which is data indicating a present time, the format of which is defined in the MPEG-2 standard. The PES header attachment circuit 39 attaches a PES header to the second attached data into a third attached data, namely a PES. Wherein, the PES header denotes a header data in the PES, the format of which is defined in the MPEG-2 standard. The PES stands for "Packetized Elementary Stream", denoting a data stream in which packetized video/audio data is included. Its format is also defined in the MPEG-2 standard. The transport header attachment circuit 40 partitions the PES (the third attached data) in every 184 bytes unit, placing each of them in a payload, and attaching a transport header into the resulting transport stream (a forth attached data). Wherein, the transport header denotes the header data in a transport stream, the format of which is defined in the MPEG-2 standard. The transport stream (the fourth attached data) is transmitted to the data reception apparatus shown in FIG. 2, via a transmission line (not shown).

Figure 9:
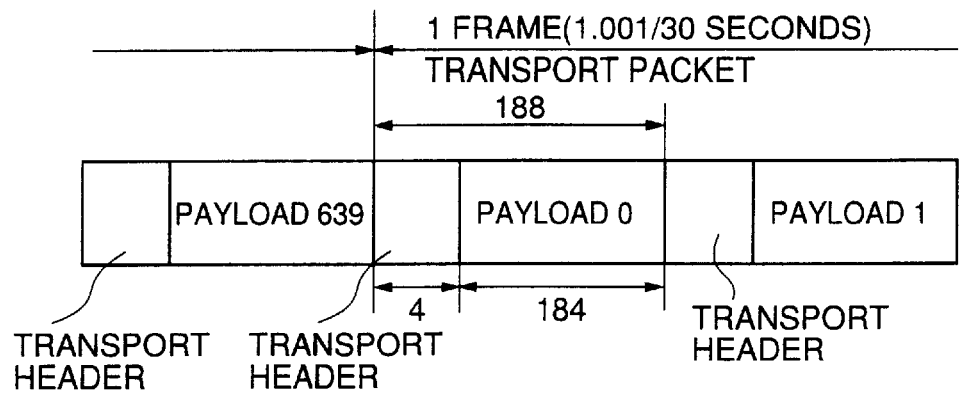
FIG. 9 shows a format of a transport stream in the 525 signals mode.

FIG. 9 shows a transport stream. A single transport packet includes 188 bytes data, and is made up of four bytes of a transport header and 184 bytes of the payload. Wherein, the transport packet denotes a packet mainly used in a transmission system, the format of which is defined in the MPEG-2 standard. Wherein, the sync block length shown in FIGS. 3 to 6 and the single transport packet length are the same being 188 bytes. However, the sync block length is not necessarily limited to 188 bytes, opposed to the fact that the single transport packet length must be 188 bytes.

FIG. 23 shows an example configuration of a four-byte transport header.

Figure 10:
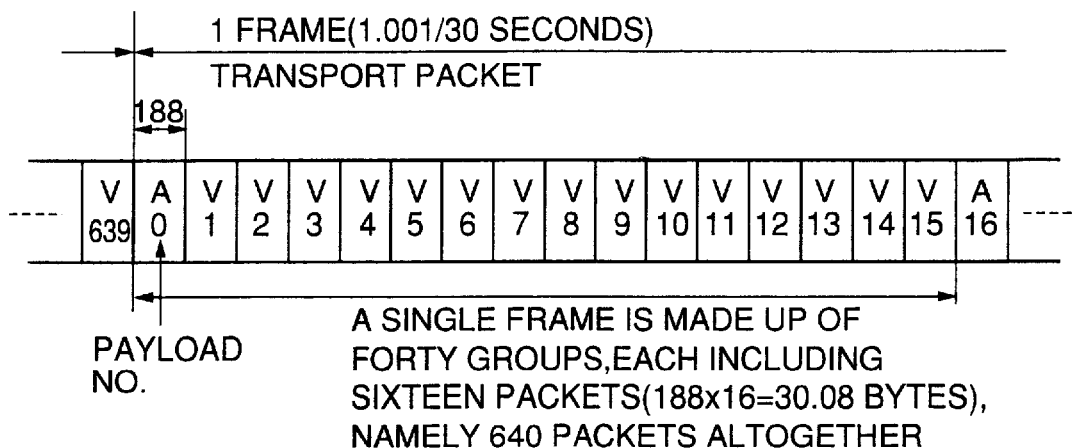
FIG. 10 shows the alignment of video/audio data in the transport stream in the 525 signals mode.

FIG. 10 shows the configuration of the transport stream (layout of video and audio data packets). As shown in FIG. 10, a single frame is made up of 640 transport packets. Specifically, it is comprised of forty transport packets of audio data and 600 transport packets of video data. A packet of audio data and fifteen packets of video data are both repeated forty times from the beginning of the frame. Thus, the audio data transmission capacity is 7360 bytes (184×40), while the video data transmission capacity is 110,400 bytes (184×600).

As described above, the PES is made from the video/audio data before the transport stream is generated.

Figure 11:
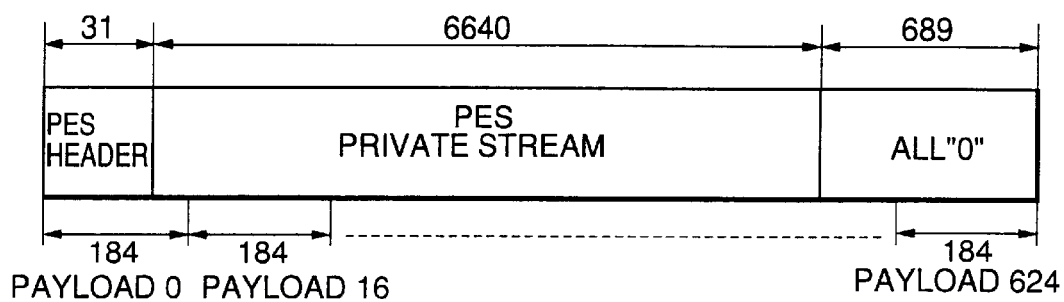
FIG. 11 shows a PES stream of audio data in the CRC-OFF and 525 signals mode.
Figure 12:
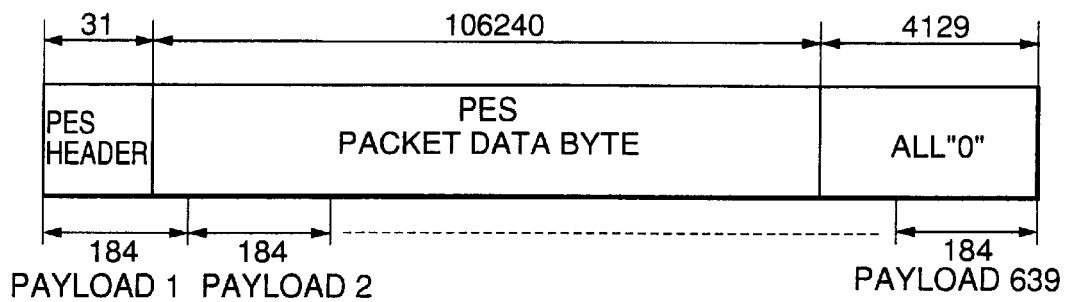
FIG. 12 shows a PES stream of video data in the CRC-ON and 525 signals mode.

FIGS. 11 and 12 show the formats of the PES streams for audio data and video data, respectively. As shown in FIG. 11, the PES stream for audio data is comprised of 31 byte PES header, 6640 byte PES private stream, and 689 byte data of all "0's". As shown in FIG. 12, the PES stream for video data is comprised of 31 byte PES header, 106,240 byte PES packet data byte, and 4,129 byte data of all "0's".

Wherein, the PES stream for audio data uses the PES private stream, while the PES stream for video data uses the PES packet data byte. This emanates from the fact that the audio data (uncompressed audio data) does not depend upon the MPEG-2 standard, and is handled as a private stream. Note that the private stream denotes a user-usable data stream, the format of which is defined in the MPEG-2 standard.

FIG. 24 shows the configuration of a 31-byte PES header. Note that the configuration is just an example, and the scope and spirit of the present invention will not be limited by the configuration.

In FIG. 24, each PTS(Presentation Time Stamp) that a reference numeral "*1" is attached to is a time record indicating PES time. This is calculated in the following manner by the PTS generation/attachment circuit 37: First, a clock signal of 90 kHz locked in accordance with frame synchronization (30/1.001 Hz), is counted by a counter (not shown). The resulting count is then subjected to a modulo 233 arithmetic. The calculation result will be the time record, and be put in the PES header. Note that the clock frequency of 90 kHz will be generated by the 300 frequency-division circuit 38 (in FIG. 1) performing frequency-division of a video system clock of 27 MHz by 300.

In FIG. 24, a PES private data that reference numeral "*2" is attached to is optional. Its data length will be a user-usable 128 bits, if the data is necessary. An example format of the data will be as follows:

1. For transmission of a video elementary stream:
   The PES private data is optional. Leaving the data in the PES header, a series of "1"s is put in there;
2. For the transmission of a CRCC, audio data, video system code, and audio system code:
   The PES private data is a series of 120-bits of "1"s at the beginning. In addition, the last eight bits are: "11111110" for the CRCC; "11111111" for the audio data; "11111100" for the video system code; and "11111101" for the audio system code.

As shown in FIGS. 11 and 12, the PES stream is partitioned from the beginning of the PES header in every 184-byte unit, and placed in each payload of the transport stream.

The packetized transport data is transmitted along with a clock signal CK in a 8-bit parallel manner. The frequency of the clock signal CK is 3.605995 MHz (640×188×(30/1.001)). The clock signal CK can be generated by a PLL (Phase-Locked Loop) circuit (not shown). Otherwise, an asynchronous clock signal of 3.605995 or more can be used for the clock signal CK. For use of an asynchronous clock signal, a frame of 640 packets is transmitted in series before the transport packet of 184 bytes of "0"s along with a transport header is repeatedly transmitted filling until the beginning of the next frame. Since communication with the VDR 20 is made using the clock signal locked to the frame synchronization, a synchronizing process, a clock conversion process by the FIFO circuit (located in the center of the entire circuit), and other related connections are necessary.

Next, the reception operation of the data reception apparatus (see FIG. 2) in the CRC-OFF and 525 signals mode (see FIG. 3) will be described hereafter.

First, a packetized transport data (transmission data) along with the clock signal CK is received in a 8-bit parallel manner. Wherein, as mentioned above, the frequency of the clock signal CK is 3.605995 MHz or more. When an asynchronous clock signal is used for the clock signal CK, communication with the VDR 70 will be made in synchronization with the clock signal CK locked to the frame synchronization. Therefore, a synchronizing process, a clock conversion by the FIFO circuit (located in the center of the entire circuit), and other related connections, are necessary.

Thereafter, a video/audio data combination is made, as will be described hereafter.

First, the transport header separation circuit 51 separates the transport header from the received data, outputting the resultant first separated data. When the transport header separation circuit 51 separates the "sync byte" of 47H from the transport header(shown in FIG. 23), synchronous protection is built against possible error. Wherein, the "sync byte" denotes a synchronous signal (in a byte unit).

Figure 22:
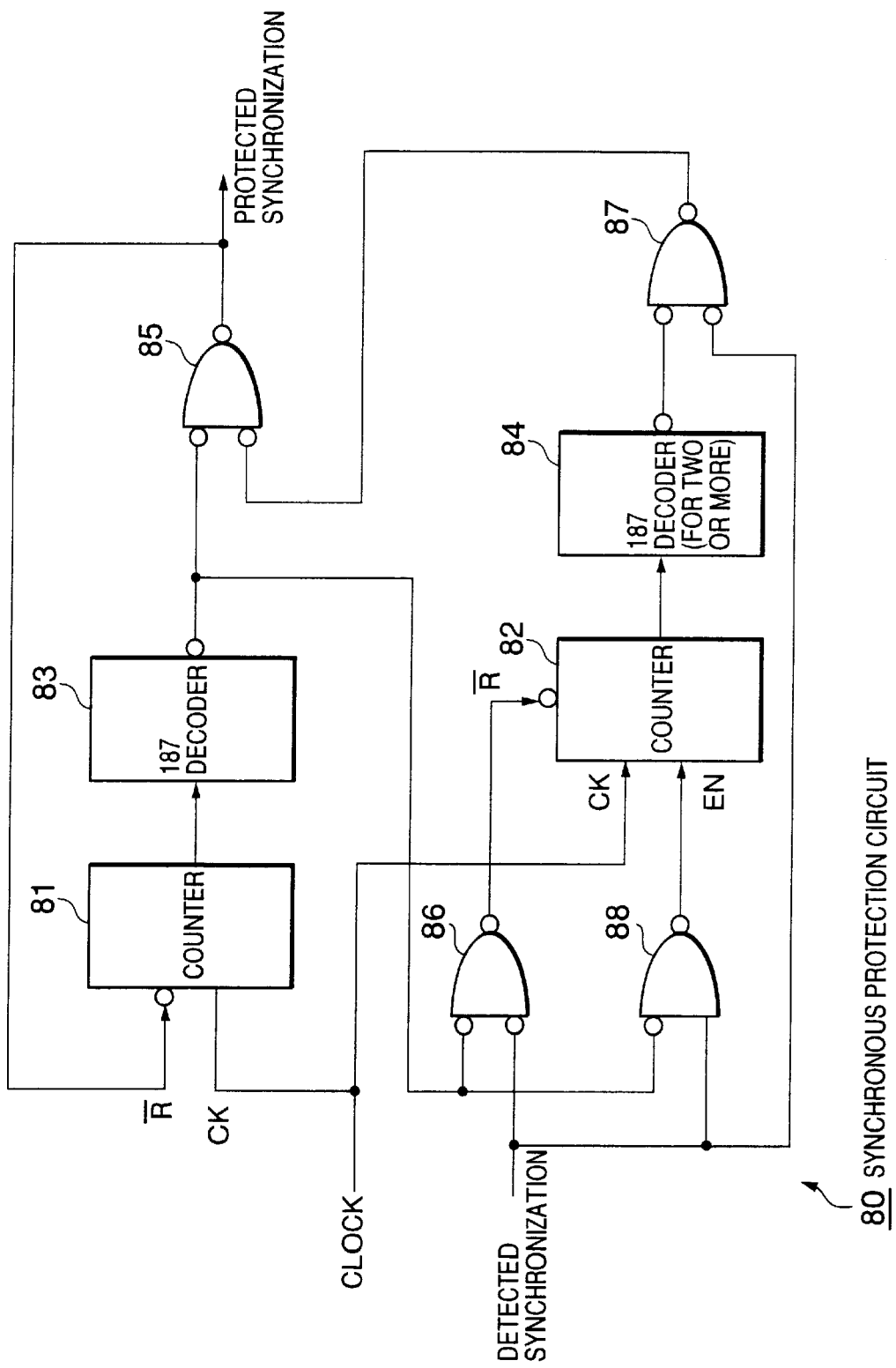
FIG. 22 shows an example configuration of a synchronous (transport header) protection circuit used in a transport header separation circuit of the data reception apparatus in FIG. 2.

FIG. 22 shows the configuration of a synchronous protection circuit 80 prepared in the transport header separation circuit 51. Here, synchronization detection is allowed to be successfully made by having successively detected the "sync byte (47H)" m (m≧1) times. Specifically, supposing a situation where another "sync byte (47H)" has already been detected 188 bytes ago when the latest "sync byte" is detected, and has continued m (m≧1) times. In this case, a synchronous detection signal indicating that synchronous detection is successfully made, will be sent to the synchronous protection circuit 80. In addition, the aforementioned clock signal CK is also supplied to the synchronous protection circuit 80. The synchronous protection circuit 80 then outputs a synchronous protection signal indicating synchronous protection has occurred.

The synchronous protection circuit 80 in FIG. 22 is made up of the first and second counters 81 and 82, the first and second decoders 83 and 84, an AND gate 85, the first and second OR gates 86 and 87, and a blocking gate 88. The first counter 81 counts in synchronism with the clock signal CK, outputting the resulting first count signal, indicating the resulting first count. The first count of the counter 81 is reset into a initial value "0" by the first reset signal application described later. The first count signal is sent to the first decoder 83. The first decoder 83 outputs the first decoded signal of an active low, when the first count equals "187". The first decoded signal is sent to the first counter 82 as the first reset signal, via an AND gate 85. The AND gate 85 outputs a protected synchronous signal. Accordingly, the first counter 81, the first decoder 83, and the AND gate 85 act in combination as a base-188 counter.

The aforementioned first decoded signal is sent to one of the input terminals of the first OR gate 86, and the blocking terminal of the blocking gate 88. The detected synchronous signal is sent to the other input terminal of the first OR gate 85 and the input terminal of the blocking gate 88. Thus, when the first decoder 83 sends the first decoded signal, and the detected synchronous signal of an active low is also sent, the first OR gate sends a second reset signal of an active low to the second counter 82. In response to the second reset signal, the second count of the second counter 82 is reset into the initial value "0". Incidentally, if the detected synchronous signal is not an active low when the first decoded signal is an active low, the blocking gate 88 sends an enable signal of an active high to the counter 82. This causes the counter 82 to count up the second count in synchronism with the clock signal CK. When the second count reaches n (n≧1), the second decoder 84 sends a second decoded signal of an active low to one of the input terminals of the second OR gate 87. The decoded signal of the active low indicates that a pulling-into-synchronism mode has been entered. Thereafter, when either the detected synchronous signal or the first decode signal is activated, the AND gate 85 outputs the first reset signal, resetting both the protected, latest synchronous signal and the first counter 81. Incidentally, FIG. 2 shows the configuration for n=2.

Subsequent circuits of the synchronous protection circuit 80 acts in synchronism with the protected, latest synchronous signal.

Note that when an asynchronous clock signal is used for the clock signal CK, the number of transport packets is unsettled. Therefore, a synchronous protection is not applied.

Next, the PES header detection circuit 52 separates a PES header from the first separated data, outputting the resultant second separated data. Wherein, after a frame synchronization, "packet start code prefix"(000001H) (see FIG. 24) detected first in the case that the "payload start indicator"(000001H) in the transport header is set to 1, will be determined as a PES header for an audio data. And a next detected "packet start code prefix"(000001H) (see FIG. 24) will be determined as a PES header for a video data. Alternatively, when the PID of the transport header is detected, and if it is identical with "1001H" as shown in FIG. 23, the data can be determined as audio data. Otherwise, if it is identical with "1000H", the data can be determined as video data.

The PTS detection circuit 53 detects and separates a PTS from the second separated data, outputting the resulting third separated data. The separation of the PTS is necessary for the FIFO circuits (detailed later) to read out in synchronism with the audio/video data. The PES private data separation circuit 54 separates a PES private data from the third separated data, outputting the resultant fourth separated data.

The PES private data separated by the PES private data separation circuit 54 enables identification of the transmitted data. The distribution circuit 55 then separates audio data and video data from the fourth separated data. The audio data is then stored in the second FIFO circuit 57, while the video data is stored in the first FIFO circuit 56. In this case, the third FIFO circuit is not used.

The combination circuit 60 combines the first out-read data (video data) (V) read out from the first FIFO circuit 56 and the second out-read data (audio data) (A) read out from the second FIFO circuit 57 together, outputting the resulting combined data to the VDR 70.

The FIFO control circuit 59 reads out video/audio data from the first and second FIFO circuits 56 and 57 in the timing corresponding to the PTS detected by the PTS detection circuit 53, combining them together by the combination circuit 60. The combination circuit 60 sends the combined data in the following order, to the VDR 70.

The first half frame:
video data (53,120 bytes)-->audio data (3320 bytes);
The second half frame:
video data (53,120 bytes)-->audio data (3,320 bytes)

Next, the operation of the data transmission apparatus (see FIG. 1) in the CRC-OFF and 625 signals mode shown in FIG. 4, will be described hereafter.

First, video/audio data is received from the VDR 20. As for video data, a video elementary stream dependent upon the MPEG-2 standard is received in a half frame unit (65,072 bytes unit). The audio data and uncompressed data is received in a half frame unit (3,984 bytes unit). More specifically, a frame of data is received in the following order:

The first half frame:
video data (65,072 bytes)-->audio data (3,984 bytes);
The second half frame:
video data (65,072 bytes)-->audio data (3,984 bytes)

Secondly, the distribution circuit 30 again separates the received video/audio data back into video data (V) and audio data (A). The video data (V) is then stored, as the first data stored, in the first FIFO circuit 31. On the other hand, the audio data (A) is stored as the second data stored in the second FIFO circuit 32. In the mode, the third FIFO circuit 33 is not used.

The multiplex circuit 35 then combines the video/audio data together. Specifically, the second out-read data (audio data) read out from the second FIFO circuit 32 is placed in the PES private stream, while the first out-read data (video data) read out from the first FIFO circuit 31 is placed in the PES packet data byte. In conclusion, the multiplex circuit 35 combines the first out-read data (video data) and the second out-read data (audio data), outputting the resultant combined data.

The PES private data attachment circuit 36 attaches a PES private data to the combined data into the first attached data. The PTS generation/attachment circuit 37 then attaches a PTS to the first attached data into a second attached data. The PES header attachment circuit 39 attaches a PES header to the second attached data into a third attached data, PES. The transport header attachment circuit 40 then partitions the PES (the third attached data) into 184 bytes units, placing them in payloads. In addition, it attaches a transport header to each of them, into a transport stream (a fourth attached data). The transport stream (the fourth attached data) is sent to the data reception apparatus shown in FIG. 2, via a transmission line (not shown).

Figure 13:
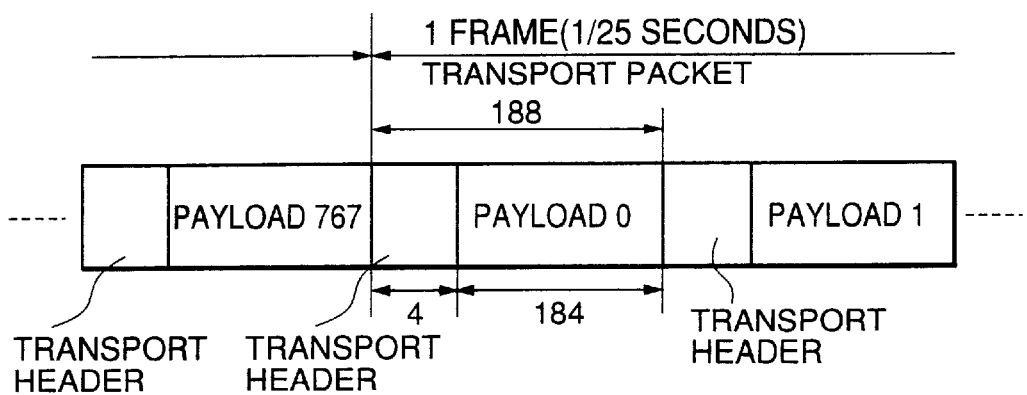
FIG. 13 shows a transport stream in the 625 signals mode.

FIG. 13 shows the configuration of a transport stream. A single transport stream with 188 bytes of data, is made up of a four-byte transport header and a 184 byte payload.

FIG. 23 shows an example format of the 4-byte transport header.

Figure 14:
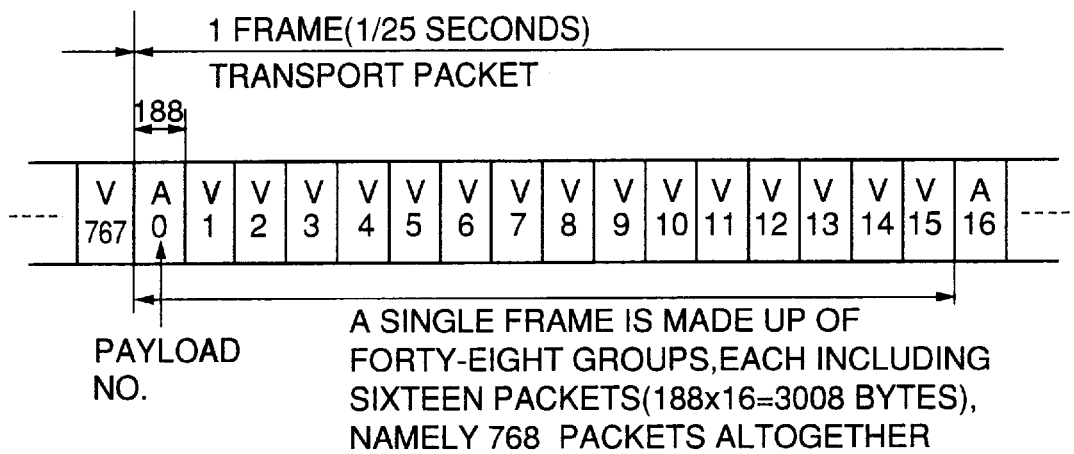
FIG. 14 shows the alignment of video/audio data in a transport stream in the 625 signals mode.

FIG. 14 shows the configuration of the transport stream including video and audio data. As shown in FIG. 14, a single frame is made up of 768 transport packets. Specifically, it is comprised of 48 transport packets of audio data and 720 transport packets of video data. A packet of audio data and fifteen packets of video data are both repeated fourteen eight times from the beginning of a frame. Thus, the audio data transmission capacity is 8,832 bytes (184×48), while the video transmission capacity is 132,480 bytes (184×720).

As described above, the video/audio data is put in a PES before being put in a transport stream.

Figure 15:
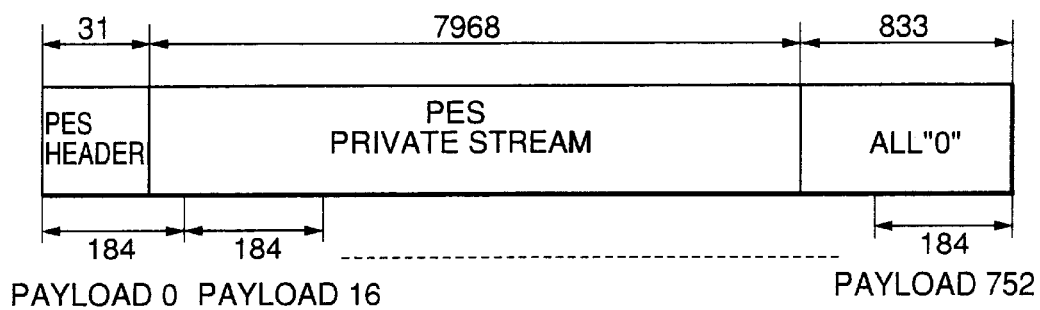
FIG. 15 shows a PES stream of audio data in the CRC-OFF and 625 signals mode.
Figure 16:
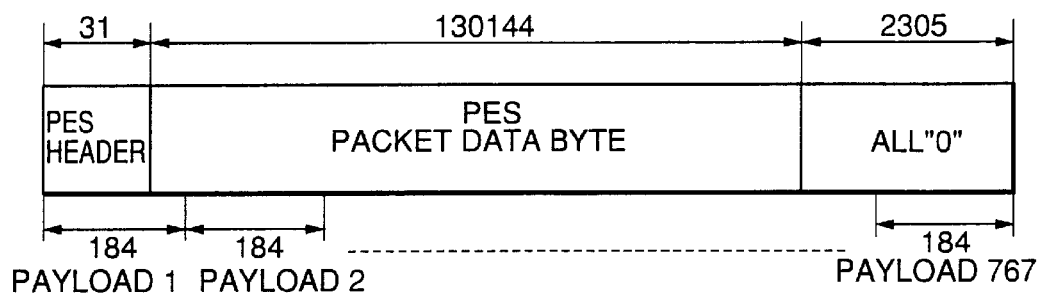
FIG. 16 shows a PTS stream of video data in the CRC-OFF and 625 signals mode.

FIG. 15 shows the configuration of a PES stream for audio data, while FIG. 16 shows the configuration of a PES stream for video data. As shown in FIG. 15, the PES stream for audio data is comprised of a 31-byte PES header, a 7,968-byte PES private stream, and a 883-byte data of all "0's".

Wherein, the PES stream for the audio data uses the PES private stream. Conversely, the PES stream for video data uses the PES packet data byte. This is due to the fact that uncompressed audio data is not based upon the MPEG-2 standard, and the audio data is handled as a private stream.

FIG. 24 shows an example configuration of a 31-byte PES header.

In FIG. 24, each PTS(Presentation Time Stamp) that a reference numeral "*1" is attached to is a time record indicating PES time. This is calculated in the following manner by the PTS generation/attachment circuit 37: First, a clock signal of 90 kHz locked in accordance with frame synchronization (30/1.001 Hz), is counted by a counter (not shown). The resulting count is then subjected to a modulo $2^{33}$ arithmetic. The calculation result will be the time record, and be put in the PES header. Note that the clock frequency of 90 kHz will be generated by the 300 frequency-division circuit 38 (in FIG. 1) performing frequency-division of a video system clock of 27 MHz by 300.

In FIG. 24, a PES private data that reference numeral "(2" is attached to is optional. Its data length will be a user-usable 128 bits, if the data is necessary.

As shown in FIGS. 15 and 16, the PES stream is partitioned from the beginning of the PES header in every 184-byte unit, and placed in each payload of the transport stream.

The packetized transport data is transmitted along with a clock signal CK in a 8-bit parallel manner. The frequency of the clock signal CK is 3.605995 MHz (640×188×(30/1.001). The clock signal CK can be generated by a PLL (Phase-Locked Loop) circuit (not shown). Otherwise, an asynchronous clock signal of 3.605995 or more can be used for the clock signal CK. For use of an asynchronous clock signal, a frame of 768 packets is transmitted in series before the transport packet of 184 bytes of "0"s along with a transport header is repeatedly transmitted filling until the beginning of the next frame. Since communication with the VDR 20 is made using the clock signal locked to the frame synchronization, a synchronizing process, a clock conversion process by the FIFO circuit (located in the center of the entire circuit), and other related connections are necessary.

Next, the reception operation of the data reception apparatus (see FIG. 2) in the CRC-OFF and 625 signals mode (see FIG. 4) will be described hereafter.

First, a packetized transport data (transmission data) along with the clock signal CK is received in a 8-bit parallel manner. Wherein, as mentioned above, the frequency of the clock signal CK is 3.605995 MHz or more. When an asynchronous clock signal is used for the clock signal CK, communication with the VDR 70 will be made in synchronization with the clock signal CK locked to the frame synchronization. Therefore, a synchronizing process, a clock conversion by the FIFO circuit (located in the center of the entire circuit), and other related connections, are necessary.

Thereafter, a video/audio data combination is made, as will be described hereafter.

First, the transport header detection circuit 51 separates the transport header from the received data, outputting the resultant first separated data. When the transport header detection circuit 51 separates the "sync byte" of 47H from the transport header(shown in FIG. 23), synchronous protection is built against possible error. Wherein, the "sync byte" denotes a synchronous signal (in a byte unit). FIG. 22 shows the configuration of a synchronous protection circuit 80 prepared in the transport header detection circuit 51. Since the synchronous protection circuit 80 has been described above in detail, its explanation is omitted.

Subsequent circuits act in synch with the protected, latest synchronous signal.

Note that when an asynchronous clock signal is used for the clock signal CK, the number of transport packets is unsettled. Therefore, a synchronous protection is not applied.

Next, the PES header detection circuit 52 separates a PES header from the first separated data, outputting the resultant second separated data. Wherein, after a frame synchronization, "packet start code prefix"(000001H) (see FIG. 24) detected first in the case that the "payload start indicator"(000001H) in the transport header is set to 1, will be determined as a PES header for an audio data. And a next detected "packet start code prefix"(000001H) (see FIG. 24) will be determined as a PES header for a video data. Alternatively, when the PID of the transport header is detected, and if it is identical with "1001H" as shown in FIG. 23, the data can be determined as audio data. Otherwise, if it is identical with "1000H", the data can be determined as video data.

The PTS detection circuit 53 detects and separates a PTS from the second separated data, outputting the resulting third separated data. The separation of the PTS is necessary for the FIFO circuits (detailed later) to read out in synchronism with the audio/video data. The PES private data separation circuit 54 separates a PES private data from the third separated data, outputting the resultant fourth separated data. The PES private data separated by the PES private data separation circuit 54 enables identification of the transmitted data. The distribution circuit 55 then separates audio data and video data from the fourth separated data. The audio data is then stored in the second FIFO circuit 57, while the video data is stored in the first FIFO circuit 56. In this case, the third FIFO circuit is not used.

The combination circuit 60 combines the first out-read data (video data) (V) read out from the first FIFO circuit 56 and the second out-read data (audio data) (A) read out from the second FIFO circuit 57 together, outputting the resulting combined data to the VDR 70.

The FIFO control circuit 59 reads out video/audio data from the first and second FIFO circuits 56 and 57 in the timing corresponding to the PTS detected by the PTS detection circuit 53, combining them together by the combination circuit 60. The combination circuit 60 sends the combined data in the following order, to the VDR 70.

The first half frame:
 video data (65,072 bytes)-->audio data (3984 bytes);
The second half frame:
 video data (65,072 bytes)-->audio data (3,984 bytes)

Next, the operations of the data transmission apparatus (see FIG. 1) in the CRC-ON and 525 signals mode, and in the CRC-ON and 625 signals mode shown in FIGS. 5 and 6, respectively, will be described hereafter.

First, video data/CRCC/audio data is received from the VDR 20. The division circuit 30 separates the received video data/CRCC/audio data into video data (V), CRCC, and audio data (A). The video data (V) is then stored, as the first data stored, in the first FIFO circuit 31. The audio data (A) is stored as the second data stored in the second FIFO circuit 32. On the other hand, the CRCC is stored as the third data stored, in the third FIFO circuit 33.

Figure 21:
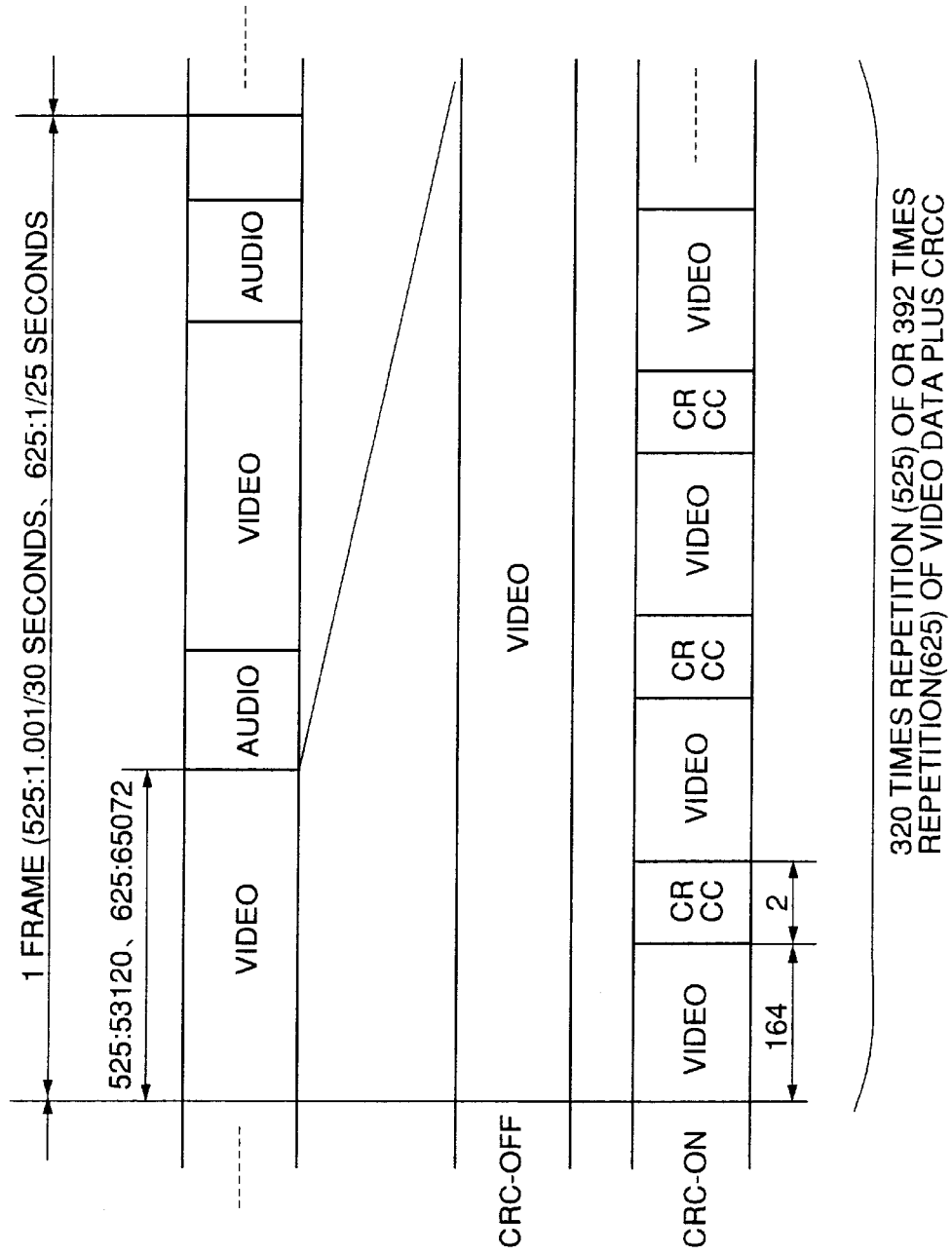
FIG. 21 shows the outline of a data transmission from/to a VRD, in the CRC-OFF mode, and in the CRC-ON mode.

As shown in the format of the CRC-ON mode in FIG. 21, a half frame of video data includes 53,120 bytes in the 525 signals mode. Otherwise, it includes 65,072 bytes in the 625 signals mode. Specifically, it includes 320 times repetition of both video data (164 bytes) and then CRCC (two bytes), in the 525 signals mode. Otherwise, it includes 392 times the same in the 625 signals mode.

Subsequent process in terms of audio data or in other related connections, by the distribution circuit 30 is the same as that in the CRC-OFF mode.

The multiplex circuit 35 then combines the video/audio data together. Specifically, the second out-read data (audio data) read out from the second FIFO circuit 32 is placed in the PES private stream, while the first out-read data (video data) read out from the first FIFO circuit 31 is placed in the PES packet data byte. In conclusion, the combination circuit 35 combines the first out-read data (video data) and the second out-read data (audio data), outputting the resultant combined data.

The PES private data attachment circuit 36 attaches a PES private data to the combined data into the first attached data. The PTS generation/attachment circuit 37 then attaches a PTS to the first attached data into a second attached data. The PES header attachment circuit 39 attaches a PES header to the second attached data into a third attached data, PES. The transport header attachment circuit 40 then partitions the PES (the third attached data) into 184 bytes units, placing them in payloads. In addition, it attaches a transport header to each of them, into a transport stream (a fourth attached data). The transport stream (the fourth attached data) is sent to the data reception apparatus shown in FIG. 2, via a transmission line (not shown).

Figure 17:
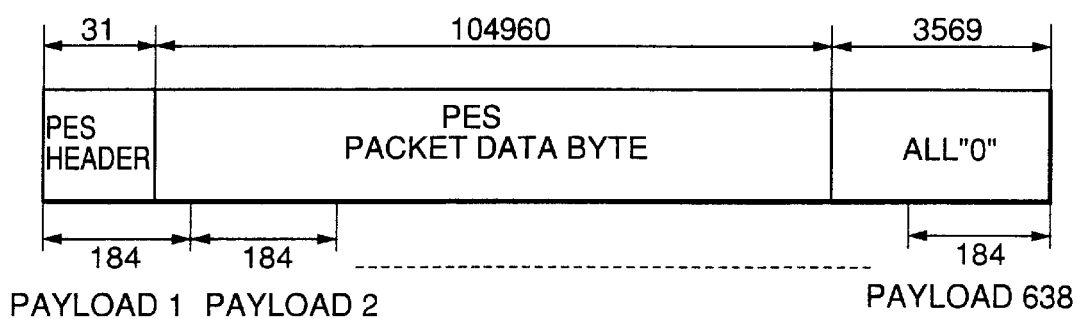
FIG. 17 shows a PES stream of video data in the CRC-ON and 525 signals mode.
Figure 18:
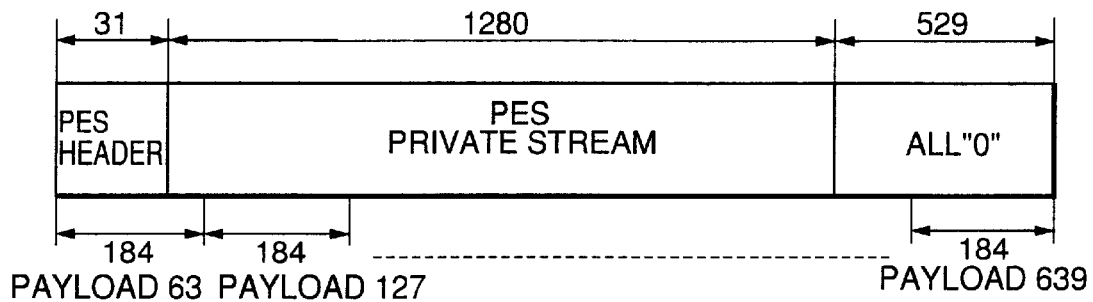
FIG. 18 shows a PES stream for the CRCC in the CRC-ON and 525 signals mode.
Figure 19:
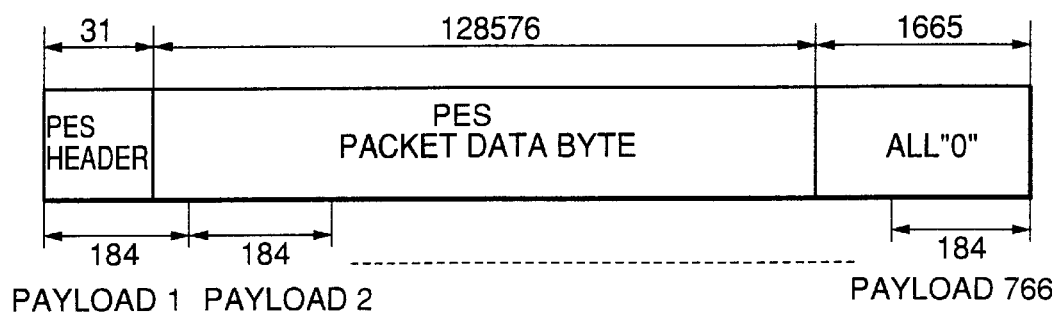
FIG. 19 shows a PES stream of video data in the CRC-ON and 625 signals mode.
Figure 20:
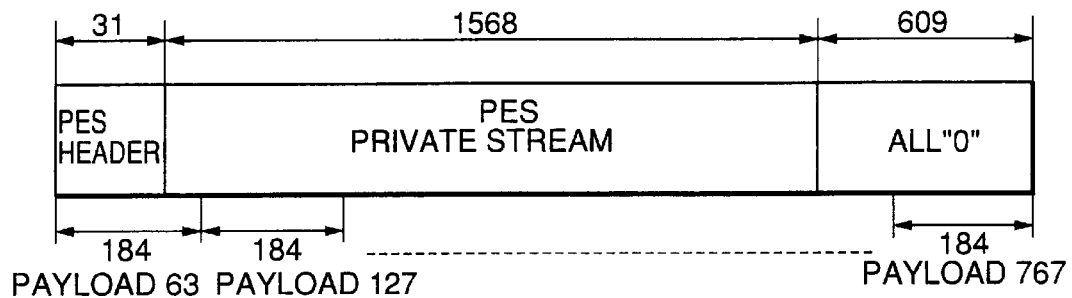
FIG. 20 shows a PES stream for a CRCC in the CRC-ON and 625 signals mode.

FIG. 17 shows the format of the PES stream for video data in the 525 signals mode. FIG. 18 shows the format of the PES stream for the CRCC in the 525 signals mode. Furthermore, FIG. 19 shows the format of the PES stream for video data in the 625 signals mode. FIG. 20 shows the format of the PES stream for the CRCC in the 625 signals mode.

As shown in FIG. 17, the PES stream for video data in the 525 signals mode is made up of a 31-byte PES header, a 104,960-byte PES packet data byte, and a 3,569-byte data of all "0's". As shown in FIG. 18, the PES stream for the CRCC in the 525 signals mode is made up of a 31-byte PES header, a 1,280-byte PES private stream, and a 529-byte data of all "0's". On the other hand, as shown in FIG. 19, the PES stream for video data in the 625 signals mode is made up of a 31-byte PES header, a 128,576-byte PES packet data byte, and a 1,665-byte data of all "0's". As shown in FIG. 20, the PES stream for the CRCC in the 625 signals mode is made up of a 31-byte PES header, a 1,568-byte PES private stream, and a 609-byte data of all "0's".

Next, the operation of the data reception apparatus (see FIG. 2) receiving input data in the CRC-ON and 525 signals mode (shown in FIGS. 5 and 6), and in the CRC-ON and 625 signals mode, will be described hereafter.

Since the data reception operation in the mode is identical to that of the CRC-OFF mode, its explanation is omitted here.

After the reception operation, the following processes of combining video/audio data will be performed.

The operation of separating the transport header by the transport header detection circuit 51 is identical to that of the CRC-OFF mode. Accordingly, its explanation is omitted here. The PES header detection circuit 52 separates the PES header in the following method: After a frame synchronization, a "packet start code prefix"(000001H) (see FIG. 24) is detected first in a case where the "payload start indicator"(000001H) in the transport header is set to 1, will be determined as a PES header for an audio data. Secondly detected "packet start code prefix"(000001H) (see FIG. 24) will be determined as a PES header for a video data, and a "packet start code prefix"(000001H) (see FIG. 24) detected thirdly will be determined as a PES header of a CRCC. Alternatively, detecting the PID of the transport header, if it is identical with "1001H" shown in FIG. 23, the data can be determined as audio data. If it is identical with "1000H", the data can be determined as video data. Otherwise, if it is identical with "1002H", the data can be determined as a CRCC.

The PTS detection circuit 53 detects and separates a PTS from the second separated data, outputting the resulting third separated data. The PES private data separation circuit 54 separates the PES private data from the third separated data, outputting the resultant fourth separated data. The distribution circuit 55 then separates audio data, video data, and a CRCC from the fourth separated data. The audio data is then stored in the second FIFO circuit 57, while the video data is stored in the first FIFO circuit 56. In addition, the CRCC is stored in the third FIFO circuit 58.

The combination circuit 60 combines the first out-read data (video data) (V) read out from the first FIFO circuit 56, the second out-read data (audio data) (A) read out from the second FIFO circuit 57, and the third out-read data, (CRCC) (C) outputting the resultant combined data to the VDR 70.

The FIFO control circuit 59 reads out video/CRCC/audio data from the first, second, and third FIFO circuits 56, 56, and 57 in the timing corresponding to the PTS detected by the PTS detection circuit 53, combining them together by the combination circuit 60. The combination circuit 60 sends the resultant combined data as output data to the VDR 70.

As shown in the format in the CRC-ON mode in FIG. 21, a half frame of the output data includes 53,120 bytes in the 525 signals mode. Otherwise, it includes 65,072 bytes in the 625 signals mode. Specifically, it includes 320 times repetition of both video data (164 bytes) and then CRCC (two bytes), in the 525 signals mode. Otherwise, it includes 392 times the same in the 625 signals mode.

Preferable embodiments according to the present invention have been described above. However, the present invention is not limited to the aforementioned embodiments. It should be understood that many different widely apparent modifications can be made without departing from the spirit and scope of the present invention. For example, input data can be made up of only video and audio data dependent upon the MPEG-2 standard. In this case, as described above, the third FIFO circuit 33 in the data transmission apparatus shown in FIG. 1, and the third FIFO circuit 58 in the data reception apparatus shown in FIG. 2 can be omitted.

Furthermore, the PTS is not essential in the present invention. Accordingly, the PTS generation/attachment circuit 37, the 300 frequency-division circuit 38 in the data transmission apparatus, and the PTS detection circuit 53 in the data reception circuit shown in FIG. 2 can also be omitted.

As described above, the present invention will have the following results:

1) For MPEG-2 based transmission/reception of video data, audio data (uncompressed audio data and compressed audio data not dependent upon the MPEG-2 standard), and user data, the audio data and the user data will be identified by transmitting a corresponding discriminant flag in the PES private data;
2) Video data dependent upon the MPEG-2 standard, in which an error correction code, an error detection code, and other related connections unique to a recording apparatus are attached to, will be directly decoded by a MPEG-2 decoder in the following method: First, separation is performed. Secondly, MPEG-2 based video data is put in a PES stream, while the error correction code, the error detection code, and the other related connections are put in a PES private stream. Thirdly, the PES and PES private streams are transmitted or received via another packet in the transport stream. Lastly, the resultant received data is subjected to error correction and error detection. This enables the MPEG-2 decoder to directly decode the MPEG-2 based video data.
3) The 525/59.94 component signal and the 625/50 component signal will be both processed through the same circuit. This can be realized by setting the frame frequency of the 625/50 component signal to be (5.005/6) times that of the 525/59.94 component signal, and the processing bit number per a frame of the former to be (6/5.005) times that of the latter, changing over between the two frame frequencies and processing bit numbers per a frame.
4) Received data will be identified as MPEG-2 based video data, audio data, or user data. This is achieved by fixing the occurred ratios of video data, audio data, and user data each to a frame of video data, and the location to the frame, for the 525/59.94 component signal and the 625/50 component signal.
5) The probability of an error occurring in the received data and its propagation will be drastically reduced by protecting the transport header. Protection enables for successful acquisition of the transport header, even though the possible-occurrence code transmission error prevents detection of the transport header.

Note that as many different widely apparent embodiments of the present invention can be made without departing from the spirit and scope thereof, it is to be understood that the invention is not limited to the specific embodiments thereof; except as defined in the appended claims.

What is claimed is:

1. A system comprising:
   a data transmission apparatus, which receives input data including MPEG-2 based video data and non-MPEG-2 based audio data, and transmits transmission data, the data transmission apparatus comprising:
   first separation means for separating the input data into MPEG-2 based video data and non-MPEG-2 based audio data;
   a first temporary memory circuit for temporarily storing the MPEG-2 based video data separated by the first separation means as first data stored, and reading out the first data stored as first out-read data;
   a second temporary memory circuit for temporarily storing the non-MPEG-2 based audio data separated by the first separation means as second data stored, and reading out the second data stored as second out-read data;
   a first combination circuit for combining the first out-read data and the second out-read data into first combined data, and outputting the first combined data;
   a PES private data attachment circuit for attaching PES private data to the first combined data to produce first attached data, and outputting the first attached data;
   a PES header attachment circuit for attaching a PES header to the first attached data to produce second attached data, and outputting the second attached data;
   a transport header attachment circuit for attaching a transport header to the second attached data to produce third attached data, and outputting the third attached data; and
   a means for transmitting the third attached data as the transmission data; and
   a data reception apparatus, which receives the transmission data transmitted from the data transmission apparatus, and outputs output data, the data reception apparatus comprising:
   a transport header separation circuit for separating the transport header from the received transmission data to produce first separated data, and outputting the first separated data;
   a PES header separation circuit for separating the PES header from the first separated data to produce second separated data, and outputting the second separated data;
   a PES private data separation circuit for separating the PES private data from the second separated data to produce third separated data, and outputting the third separated data;
   second separation means for separating the MPEG-2 based video data and the non-MPEG-2 based audio data from the third separated data;
   a third temporary memory circuit for storing the MPEG-2 based video data as third data stored, and reading out the third data stored as third out-read data;
   a fourth temporary memory circuit for storing the non-MPEG-2 based audio data separated by the second separation means as fourth data stored, and reading out the fourth data stored as fourth out-read data;
   a second combination circuit for combining the third out-read data and the fourth out-read data into second combined data, and outputting the second combined data; and
   a means for outputting the second combined data as the output data.

2. The reception apparatus according to claim 1, wherein the transport header separation circuit includes a transport header protection circuit protecting the transport header.

3. A system comprising:
   a data transmission apparatus, which receives input data including MPEG-2 based video data and non-MPEG-2 based audio data, and transmits transmission data, the data transmission apparatus comprising:
   first separation means for separating the input data into MPEG-2 based video data and non-MPEG-2 based audio data;
   a first temporary memory circuit for storing the MPEG-2 based video data separated by the first separation means as first data stored, and reading out the first data stored as first out-read data;

a second temporary memory circuit for storing the non-MPEG-2 based audio data separated by the first separation means as second data stored, and reading out the second data stored as second out-read data;

a first combination circuit for combining the first out-read data and the second out-read data into first combined data, and outputting the first combined data;

a PES private data attachment circuit for attaching PES private data to the first combined data to produce first attached data, and outputting the first attached data;

a PTS generation/attachment circuit for generation of a presentation time stamp, attaching the presentation time stamp to the first attached data to produce second attached data, and outputting the second attached data;

a PES header attachment circuit for attaching a PES header to the second attached data to produce third attached data, and outputting the third attached data;

a transport header attachment circuit for attaching a transport header to the third attached data to produce fourth attached data, and outputting the fourth attached data; and a means for transmitting the fourth attached data as the transmission data; and a data reception apparatus, which receives the transmission data transmitted from the data transmission apparatus, and outputs output data, the data reception apparatus comprising:

a transport header separation circuit for separating the transport header from the received transmission data to produce first separated data, and outputting the first separated data;

a PES header separation circuit for separating the PES header from the first separated data to produce second separated data, and outputting the second separated data;

a PTS detection circuit for separating the presentation time stamp from the second separated data to produce third separated data, and outputting the third separated data;

a PES private data separation circuit for separating the PES private data from the third separated data to produce fourth separated data, and outputting the fourth separated data;

second separation means for separating the MPEG-2 based video data and the non-MPEG-2 based audio data from the fourth separated data;

a third temporary memory circuit for storing the MPEG-2 based video data as third data stored, and reading out the third data stored as third out-read data;

a fourth temporary memory circuit for storing the non-MPEG-2 based audio data as fourth data stored, and reading out the fourth data stored as fourth out-read data;

a second combination circuit for combining the third out-read data and the fourth out-read data into second combined data, and outputting the second combined data; and means for outputting the second combined data as the output data.

4. The reception apparatus according to claim 3, wherein the transport header separation circuit includes a transport header protection circuit protecting the transport header.

5. A data transmission apparatus, which receives input data including MPEG-2 based video data, non-MPEG-2 based audio data, and user data, and transmits transmission data, the data transmission apparatus comprising:

separation means for separating the input data into MPEG-2 based video data, non-MPEG-2 based audio data, and user data;

a first temporary memory circuit for storing the MPEG-2 based video data as first data stored, and reading out the first data stored as first out-read data;

a second temporary memory circuit for temporarily storing the non-MPEG-2 based audio data as second data stored, and reading out the second data stored as second out-read data;

a third temporary memory circuit for temporary storing the user data as third data stored, and reading out the third data stored as third out-read data;

a combination circuit for combining the first out-read data, the second out-read data, and the third out-read data into combined data, and outputting the combined data;

a PES private data attachment circuit for attaching PES private data to the combined data to produce first attached data, and outputting the first attached data;

a PES header attachment circuit for attaching a PES header to the first attached data to produce second attached data, and outputting the second attached data;

a transport header attachment circuit for attaching a transport header to the second attached data to produce third attached data, and outputting the third attached data; and means for transmitting the third attached data as transmission data.

6. A data reception apparatus, which receives the transmission data transmitted from the data transmission apparatus according to claim 5, and outputs output data, the data reception apparatus comprising:

a transport header separation circuit for separating the transport header from the received transmission data to produce first separated data, and outputting the first separated data;

a PES header separation circuit for separating the PES header from the first separated data to produce second separated data, and outputting the second separated data;

a PES private data separation circuit for separating the PES private data from the second separated data to produce third separated data, and outputting the third separated data;

separation means for separating the third separated data into the MPEG-2 based video data, the non-MPEG-2 based audio data, and the user data;

a fourth temporary memory circuit for storing the MPEG-2 based video data as fourth data stored, and reading out the fourth data stored as fourth out-read data;

a fifth temporary memory circuit for storing the non-MPEG-2 based audio data as fifth data stored, and reading out the fifth data stored as fifth out-read data;

a sixth temporary memory circuit for storing the user data as sixth data stored, and reading out the sixth data stored as sixth out-read data;

a combination circuit for combining the fourth out-read data, the fifth out-read data and the sixth out-read data into combined data, and outputting the combined data; and means for outputting the combined data as output data.

7. The reception apparatus according to claim 6, wherein the transport header separation circuit includes a transport header protection circuit protecting the transport header.

8. The data transmission apparatus according to claim 5, wherein the user data includes system data, an error correction code, and an error detection code.

9. The data transmission apparatus according to claim 8, wherein a length of a first PES stream includes the MPEG-2 based video data; a length of a second PES stream includes the non-MPEG-2 based audio data; a length of a third PES stream includes the system data; a length of a fourth PES stream includes the error correction code; and a length of a fifth PES stream includes the error detection code; each of the first, second, third, fourth and fifth PES streams being fixed for a 525/59.94 component signal and a 625/50 component signal.

10. The data transmission apparatus according to claim 8, wherein a first PES stream including the MPEG-2 based video data; a second PES stream including the non-MPEG-2 based audio data; a third PES stream including the system data; a fourth PES stream including the error correction code; and a fifth PES stream including the error detection code, are placed on addresses PA, PB, PC, PD, and PE from the start of a frame, respectively; the addresses PA, PB, PC, PD, and PE being fixed for a 525/59.94 component signal and a 625/50 component signal.

11. The data transmission apparatus according to claim 8, wherein the error correction code and the error detection code are attached during data recording and transmitted via a PES private stream.

12. The data transmission apparatus according to claim 8, wherein a transmission clock is locked to a frame of the MPEG-2 based video data; the locations of the start and end of a frame, and the location of the end of a MPEG-2 based transport stream corresponding to a single frame are all fixed for a 525/59.94 component signal and a 625/50 component signal; and the locations of the MPEG-2 based video data, the non-MPEG-2 based audio data, the system data, the error correction code, and the error detection code are fixed.

13. The data transmission apparatus according to claim 8, wherein a transmission clock is unlocked to a frame of the MPEG-2 based video data, and data transmission corresponding to a next frame at the beginning of a MPEG-2 transport stream of a 525/59.94 component signal and a 625/50 component signal is started just after a previous frame to the next frame starts; and stream numbers for the MPEG-2 based video data, the non-MPEG-2 based audio data, the system data, the error correction code, and the error detection code are fixed.

14. The data transmission apparatus according to claim 8, wherein a flag indicating one of the MPEG-2 based video data, the non-MPEG-2 based audio data, the system data, the error correction code, and the error detection code, is attached to the PES private data.

15. A data transmission apparatus, which receives input data including MPEG-2 based video data, non-MPEG-2 based audio data, and user data, and outputs transmission data, the data transmission apparatus comprising:
  separation means for separating the input data into MPEG-2 based video data, audio data, and user data;
  a first temporary memory circuit for temporarily storing the MPEG-2 based video data as first data stored, and reading out the first data stored as first out-read data;
  a second temporary memory circuit for temporarily storing the non-MPEG-2 based audio data as second data stored, and reading out the second data stored as second out-read data;
  a third temporarily memory circuit for temporarily storing the user data as third data stored, and reading out the third data stored as third out-read data;
  a combination circuit for combining the first out-read data, the second out-read data, and the third out-read data into combined data, and outputting the combined data;
  a PES private data attachment circuit for attaching PES private data to the combined data to produce first attached data, and outputting the first attached data;
  a PTS generation/attachment circuit for generation of a presentation time stamp, attaching the presentation time stamp to the first attached data to produce second attached data, and outputting the second attached data;
  a PES header attachment circuit for attaching a PES header to the second attached data to produce third attached data, and outputting the third attached data;
  a transport header attachment circuit for attaching a transport header to the third attached data to produce fourth attached data, and outputting the fourth attached data; and
  means for transmitting the fourth attached data as transmission data.

16. A data reception apparatus, which receives the transmission data transmitted from the data transmission apparatus according to claim 15, and outputs output data, the data reception apparatus comprising:
  a transport header separation circuit for separating the transport header from the received transmission data to produce first separated data, and outputting the first separated data;
  a PES header separation circuit for separating the PES header from the first separated data to produce second separated data, and outputting the second separated data;
  a PES detection circuit for separating the presentation time stamp from the second separated data to produce third separated data, and outputting the third separated data;
  a PES private data separation circuit for separating the PES private data from the third separated data to produce fourth separated data, and outputting the fourth separated data;
  separation means for separating the fourth separated data into the MPEG-2 based video data, the non-MPEG-2 based audio data, and the user data;
  a fourth temporary memory circuit for storing the MPEG-2 video data as fourth data stored, and reading out the fourth data stored as fourth out-read data;
  a fifth temporary memory circuit for storing the non-MPEG-2 based audio data as fifth data stored, and reading out the fifth data stored as fifth out-read data;
  a sixth temporary memory circuit for storing the user data as sixth data stored, and reading out the sixth data stored as sixth out-read data;
  a combination circuit for combining the fourth out-read data, the fifth out-read data and the sixth out-read data into combined data, and outputting the combined data; and
  means for outputting the combined data as output data.

17. The reception apparatus according to claim 16, wherein the transport header separation circuit includes a transport header protection circuit protecting the transport header.

18. The data transmission apparatus according to claim 15, wherein the user data includes system data, an error correction code, and an error detection code.

19. The data transmission apparatus according to claim 18, wherein a length of a first PES stream includes the MPEG-2 based video data; a length of a second PES stream includes the non-MPEG-2 based audio data; a length of a third PES stream includes the system data; a length of a fourth PES stream includes the error correction code; and a length of a fifth PES stream includes the error detection code; each of the first, second, third, fourth and fifth PES streams being fixed for a 525/59.94 component signal and a 625/50 component signal.

20. The data transmission apparatus according to claim 18, wherein a first PES stream including the MPEG-2 based video data; a second PES stream including the non-MPEG-2 based audio data; a third PES stream including the system data; a fourth PES stream including the error correction code; and a fifth PES stream including the error detection code, are placed on addresses PA, PB, PC, PD, and PE from the start of a frame, respectively; the addresses PA, PB, PC, PD, and PE being fixed for a 525/59.94 component signal and a 625/50 component signal.

21. The data transmission apparatus according to claim 18, wherein the error correction code and the error detection code are attached during data recording and transmitted via a PES private stream.

22. The data transmission apparatus according to claim 18, wherein a transmission clock is locked to a frame of the MPEG-2 based video data; the locations of the start and end of a frame, and the location of the end of a MPEG-2 based transport stream corresponding to a single frame are all fixed for a 525/59.94 component signal and a 625/50 component signal; and the locations of the MPEG-2 based video data, the non-MPEG-2 based audio data, the system data, the error correction code, and the error detection code are fixed.

23. The data transmission apparatus according to claim 18, wherein a transmission clock is unlocked to a frame of the MPEG-2 based video data, and data transmission corresponding to a next frame at the beginning of a MPEG-2 transport stream of a 525/59.94 component signal and a 625/50 component signal is started just after a previous frame to the next frame starts; and stream numbers for the MPEG-2 based video data, the non-MPEG-2 based audio data, the system data, the error correction code, and the error detection code are fixed.

24. The data transmission apparatus according to claim 18, wherein a flag indicating one of the MPEG-2 based video data, the non-MPEG-2 based audio data, the system data, the error correction code, and the error detection code, is attached to the PES private data.

25. A data transmission method comprising:
separating input data into MPEG-2 based video data, non-MPEG-2 based audio data, and user data;
temporarily storing the MPEG-2 based video data as first data stored, the non-MPEG-2 based audio data as second data stored, and the user data as third data stored;
reading out the first data stored as first out-read data, reading out the second data stored as second out-read data, and reading out the third data stored as third out-read data;
combining the first out-read data, the second out-read data, and the third out-read data into combined data, and outputting the combined data;
attaching PES private data to the combined data to produce first attached data, and outputting the first attached data;
attaching a PES header to the first attached data to produce second attached data, and outputting the second attached data;
attaching a transport header to the second attached data to produce third attached data, and outputting the third attached data; and
transmitting the third attached data as transmission data.

26. A data reception method comprising:
receiving transmission data which includes a combination of MPEG-2 based video data, non-MPEG-2 based audio data, and user data, and has attached PES private data, a PES header, and a transport header;
separating the transport header from the received transmission data to produce first separated data, and outputting the first separated data;
separating the PES header from the first separated data to produce second separated data, and outputting the second separated data;
separating the PES private data from the second separated data to produce third separated data, and outputting the third separated data;
separating the third separated data into the MPEG-2 based video data, the non-MPEG-2 based audio data, and the user data;
storing the MPEG-2 based video data as first data stored, the non-MPEG-2 based audio data as second data stored, and the user data as third data stored;
reading out the first data stored as first out-read data, the second data stored as second out-read data, and the third data stored as third out-read data;
combining the first out-read data, the second out-read data, and the third out-read data into combined data, and outputting the combined data; and
outputting the combined data as output data.

27. A data transmission method comprising:
separating input data into MPEG-2 based video data, non-MPEG-2 based audio data, and user data;
temporarily storing the MPEG-2 based video data as first data stored, the non-MPEG-2 based audio data as second data stored, and the user data as third data stored;
reading out the first data stored as first out-read data, reading out the second data stored as second out-read data, and reading out the third data stored as third out-read data;
combining the first out-read data, the second out-read data, and the third out-read data into combined data, and outputting the combined data;
attaching PES private data to the combined data to produce first attached data, and outputting the first attached data;
attaching a presentation time stamp to the first attached data to produce second attached data, and outputting the second attached data;
attaching a PES header to the second attached data to produce third attached data, and outputting the third attached data;
attaching a transport header to the third attached data to produce fourth attached data, and outputting the fourth attached data; and
transmitting the fourth attached data as transmission data.

28. A data reception method comprising:
receiving transmission data which includes a combination of MPEG-2 based video data, non-MPEG-2 based audio data, and user data, and has attached PES private data, a presentation time stamp, a PES header, and a transport header;

separating the transport header from the received transmission data to produce first separated data, and outputting the first separated data;

separating the PES header from the first separated data to produce second separated data, and outputting the second separated data;

separating the presentation time stamp from the second separated data to produce third separated data, and outputting the third separated data;

separating the PES private data from the third separated data to produce fourth separated data, and outputting the fourth separated data;

separating the fourth separated data into the MPEG-2 based video data, the non-MPEG-2 based audio data, and the user data;

storing the MPEG-2 based video data as first data stored, the non-MPEG-2 based audio data as second data stored, and the user data as third data stored;

reading out the first data stored as first out-read data, the second data stored as second out-read data, and the third data stored as third out-read data;

combining the first out-read data, the second out-read data, and the third out-read data into combined data, and outputting the combined data; and outputting the combined data as output data.

* * * * *